United States Patent
Sendai et al.

(10) Patent No.: US 10,761,333 B2
(45) Date of Patent: Sep. 1, 2020

(54) HEAD MOUNTED DISPLAY DEVICE, SOUND TRANSMISSION SYSTEM, AND CONTROL METHOD FOR HEAD MOUNTED DISPLAY DEVICE

(71) Applicant: SEIKO EPSON CORPORATION, Tokyo (JP)

(72) Inventors: Kaori Sendai, Okaya (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/254,062

(22) Filed: Jan. 22, 2019

(65) Prior Publication Data
US 2019/0227323 A1  Jul. 25, 2019

(30) Foreign Application Priority Data

Jan. 23, 2018 (JP) ................. 2018-008628

(51) Int. Cl.
*G02B 27/01* (2006.01)
*H04R 1/10* (2006.01)
*G06F 3/0484* (2013.01)
*G06F 3/0488* (2013.01)
*H04R 5/033* (2006.01)

(52) U.S. Cl.
CPC ....... *G02B 27/0172* (2013.01); *G06F 3/0488* (2013.01); *G06F 3/04847* (2013.01); *H04R 1/1016* (2013.01); *H04R 1/1041* (2013.01); *H04R 1/1066* (2013.01); *H04R 5/0335* (2013.01); *H04R 1/105* (2013.01); *H04R 2499/15* (2013.01)

(58) Field of Classification Search
CPC ......... G02B 27/0172; H04R 1/1041; H04R 1/1016; H04R 5/0335; H04R 1/1066; H04R 2499/15; H04R 1/105; G06F 3/04847; G06F 3/0488
See application file for complete search history.

(56) References Cited

U.S. PATENT DOCUMENTS

| | | | |
|---|---|---|---|
| 9,858,720 B2 * | 1/2018 | da Veiga | G02B 27/0172 |
| 2015/0103816 A1 | 4/2015 | Nagara | |
| 2015/0324087 A1 * | 11/2015 | Gregory | G06F 3/0488 345/174 |
| 2017/0315938 A1 * | 11/2017 | Mori | G06F 9/445 |
| 2017/0329571 A1 * | 11/2017 | Heo | G06F 3/017 |
| 2018/0007255 A1 * | 1/2018 | Tang | G06K 9/3233 |

FOREIGN PATENT DOCUMENTS

JP  2015-80211 A  4/2015

* cited by examiner

*Primary Examiner* — Andrew Sasinowski
(74) *Attorney, Agent, or Firm* — Oliff PLC

(57) ABSTRACT

An HMD including an image display unit mounted on a user's head to display an image, a right earphone and a left earphone to be installed in the user's right and left ears to output sound based on a sound signal of a right channel for a right ear and a sound signal of a left channel for a left ear, a second communication unit configured to receive a sound signal, and a control unit configured to assign a sound signal for sound associated with a displayed image displayed by the image display unit and the sound signal received by the second communication unit to the left channel and the right channel to output the sound signals as sound.

15 Claims, 9 Drawing Sheets

HEAD MOUNTED DISPLAY DEVICE, SOUND TRANSMISSION SYSTEM, AND CONTROL METHOD FOR HEAD MOUNTED DISPLAY DEVICE

BACKGROUND

1. Technical Field

The invention relates to a head mounted display device, a sound transmission system, and a control method for the head mounted display device.

2. Related Art

Now, Head mounted displays are known that are display devices mounted on users' heads.

JP-A-2015-80211 discloses a controller coupled to a first device and a second device. The controller is configured to integrate two signals generated by wireless technology into a mixed signal and to transmit the mixed signal obtained by the integration between the first device and the second device.

Head mounted display devices have been used in various cases. Depending on a use case, usability of a head mounted display device may be improved by causing the head mounted display device to reproduce a plurality of sound signals.

An advantage of the invention is to improve the usability of a head mounted display device.

SUMMARY

To accomplish the object, an aspect of the invention includes a display unit mounted on a user's head to display an image, a sound output unit configured to output sound to a right channel and to a left channel, a communication unit configured to receive a sound signal, and a control unit configured to assign sounds based on a sound signal associated with the image displayed by the display unit and a sound signal received by the communication unit to the left channel and the right channel for output.

According to this configuration, the user may listen to the sound signal for the sound associated with the displayed image and the sound signal received by the communication unit. This allows usability of the head mounted display device to be improved.

An aspect of the invention includes an acquisition unit configured to acquire content data for display including a sound signal, wherein the control unit is configured to cause the display unit to display an image based on the content data acquired by the acquisition unit, and cause the sound output unit to output sound based on the sound signal in the content data and the sound based on sound signal received by the communication unit.

According to the configuration, while the display unit is displaying an image based on the content data, the sound output unit may output the sound based on the sound signal in the content data and the sound based on the sound signal received by the communication unit.

An aspect of the invention includes a user interface unit configured to accept at least one of an instruction to change a volume of a sound signal output by the sound output unit and an instruction to mute the sound signal, wherein the control unit is configured to cause one of a change in the volume of the sound signal output by the sound output unit and muting of the sound signal to be executed in accordance with the instruction accepted by the user interface.

According to the configuration, the user interface may be operated to change the volume of the sound signal output by the sound output unit or to mute the sound signal.

According to an aspect of the invention, the user interface unit is configured to accept, for each channel of the sound output unit, at least one of the instruction to change the volume of the sound signal and the instruction to mute the sound signal.

According to the configuration, one of a change in the volume of the sound signal and muting of the sound signal may be executed for each channel of the sound output unit.

According to an aspect of the invention, the control unit is configured to enable switching between a first sound mode in which the sound based on the sound signal in the content data is output from one of the right channel and the left channel, while the sound based on the sound signal received by the communication unit is output from the other of the right channel and the left channel, and a second sound mode in which one of the sound based on the sound signal in the content data and the sound based on the sound signal received by the communication unit is output from the right channel and the left channel, and the user interface unit is configured to accept, in the first sound mode, the instruction for each channel of the sound output unit, and accept, in the second sound mode, the instruction for a channel through which a sound signal is being output.

According to the configuration, changing the sound mode enables a change in the channel for which a change in the volume or muting can be set.

According to an aspect of the invention, the user interface unit includes a graphical user interface including an image to be displayed by the display unit.

According to the configuration, operations may be performed while the image displayed by the display unit is visually recognized. This allows the operations to be more easily performed.

According to an aspect of the invention, the user interface unit includes an operating unit configured to accept an operation, and is configured to accept at least one of the instruction to change the volume of the sound signal and the instruction to mute the sound signal, based on an operation including one of touching, pressing, and impacting the operating unit.

According to the configuration, one of a change in the volume of the sound signal and muting of the sound signal may be instructed by one of the operation of touching the operating unit, the operation of pressing the operating unit, and the operation of impacting the operating unit.

According to an aspect of the invention, the display unit is a transmissive display unit configured to display an image in a display area through which outside scenery is transmitted.

According to the configuration, an operation of changing the volume of the sound signal output by the sound output unit and an operation of muting the sound signal may be performed while the image displayed in the display area through which outside scenery is transmitted is visually recognized.

According to an aspect of the invention, the control unit is configured to cause the display unit to display a text corresponding to the sound based on the sound signal received by the communication unit.

According to the configuration, the display unit may be caused to display the text corresponding to the sound signal.

Thus, in a place where sound signals are difficult to listen to, contents of the sound may be understood using the text.

According to an aspect of the invention, the control unit is configured to change, to change an output state of the sound based on the sound signal received by the communication unit, a display state of the text to be displayed by the display unit.

According to the configuration, for a change in the output state of the sound signal, the display state of the text to be displayed by the display unit is changed. This allows a change in the output state of the sound signal to be recognized based on the display state of the text.

According to an aspect of the invention, the communication unit is configured to receive the sound signal through wireless communication.

According to the configuration, the sound signal may be received through wireless communication. The configuration eliminates a need for wired coupling of the head mounted display device for reception of sound signals, enabling an increase a range within which sound signals are receivable, compared to the wired coupling.

To accomplish the object, an aspect of the invention provides a sound transmission system including a transmission device configured to transmit a sound signal, and a head mounted display device configured to receive the sound signal transmitted by the transmission device, wherein the head mounted display device includes a display unit mounted on a user's head to display an image, a sound output unit configured to output sound to a right channel and to a left channel, a communication unit configured to receive the sound signal, and a control unit configured to assign sounds based on a sound signal associated with the image displayed by the display unit and the sound signal received by the communication unit to the left channel and the right channel for output.

According to this configuration, the user may listen to the sound signal for the sound associated with the displayed image and the sound signal received by the communication unit. This allows usability of the head mounted display device to be improved.

To accomplish the object, an aspect of the invention provides a control method for a head mounted display device including a display unit mounted on a user's head to display an image, a sound output unit configured to output sound to a right channel and to a left channel, and a communication unit, the control method including receiving a sound signal by the communication unit, assigning sounds based on a sound signal associated with the image displayed by the display unit and the sound signal received by the communication unit to the left channel and the right channel, and outputting, by the sound output unit, the sound signal assigned to the left channel and the sound signal assigned to the right channel.

According to this configuration, the user may listen to the sound signal for the sound associated with the displayed image and the sound signal received by the communication unit. This allows usability of the head mounted display device to be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described below with reference to the accompanying drawings.

Figure 1:
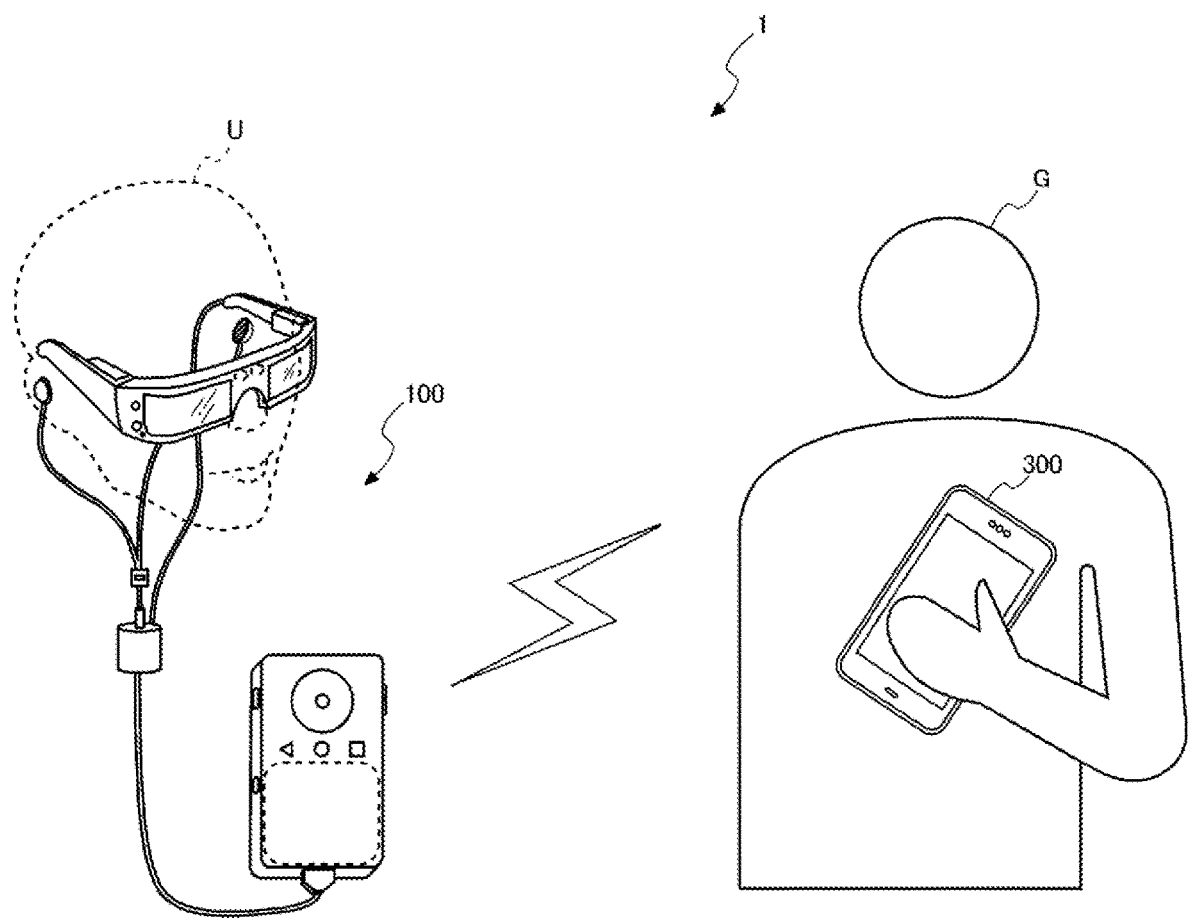
FIG. 1 is a diagram of a system configuration of a sound transmission system.

FIG. 1 is a diagram of a system configuration of a sound transmission system 1 according to an exemplary embodiment.

System Configuration

The sound transmission system 1 includes a head mounted display device 100 and a terminal device 300, which are coupled together such that the devices 100 and 300 can performed data communicate in wireless communication with each other. The terminal device 300 is a device corresponding to a "transmission device" according to the invention. The terminal device 300 is a compact portable terminal, e.g., a smartphone, a tablet terminal, or a Personal Digital Assistant (PDA).

The head mounted display device 100 is a display device mounted on the head. The head mounted display device 100 is also referred to as a head mount display, and is hereinafter abbreviated as the HMD. The HMD 100 is an optically transmissive display device allowing a user to visually recognize virtual images and to directly visually recognize an outside scenery. Note that a virtual image visually recognized by the user through the HMD 100 is referred to as a "displayed image" for convenience herein.

Furthermore, although FIG. 1 illustrates one HMD 100, the number of HMDs 100 wirelessly coupled to the terminal device 300 is not limited to one but an arbitrary number of HMDs may be provided. A person who uses the HMD 100 is hereinafter referred to as a user U, and a person who uses the terminal device 300 is hereinafter referred to as a guide G.

Configuration of Terminal Device

Figure 2:
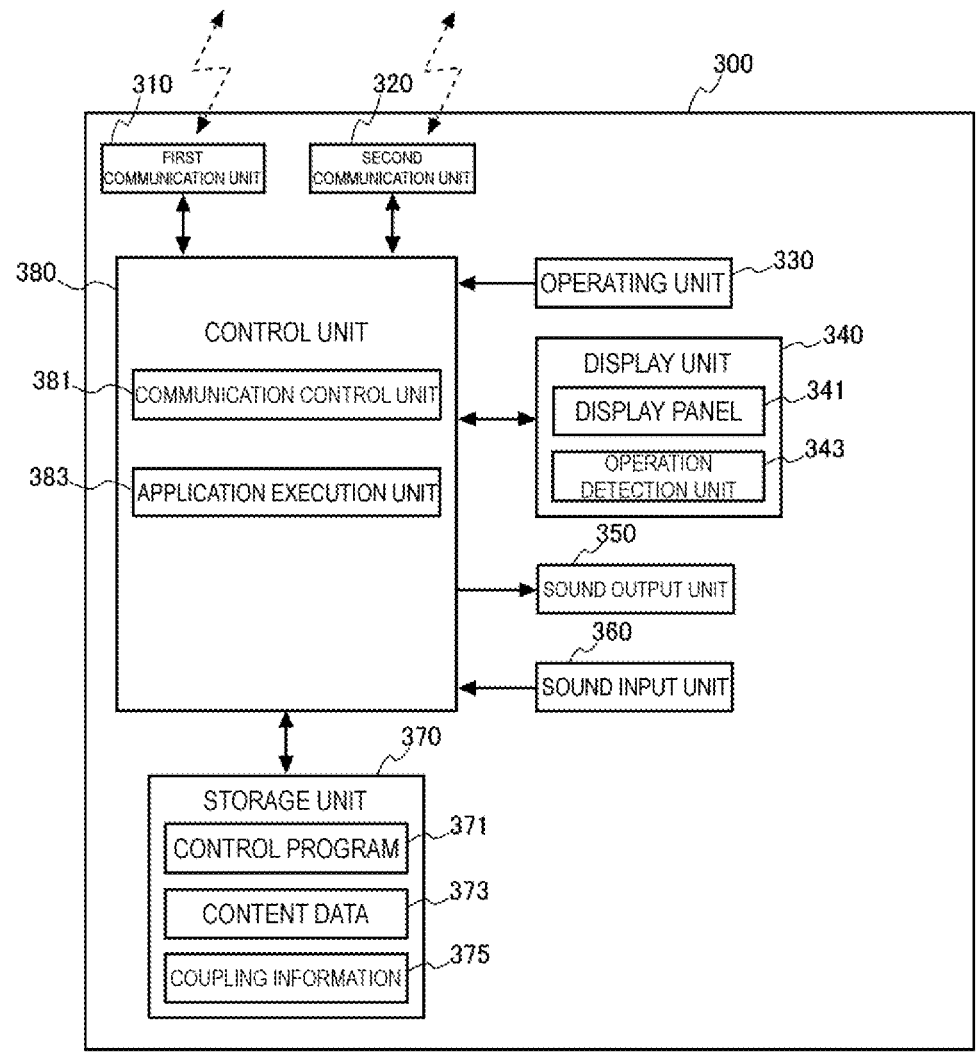
FIG. 2 is a diagram of a configuration of a terminal device.

FIG. 2 is a diagram of a configuration of the terminal device 300.

The terminal device 300 includes a first communication unit 310, a second communication unit 320, an operating unit 330, a display unit 340, a sound output unit 350, a sound input unit 360, a storage unit 370, and a control unit 380.

The first communication unit 310 is an interface communicating wirelessly with other equipment including the HMD 100. The first communication unit 310 includes an antenna, an RF circuit, a baseband circuit, and a communication control circuit (none of which are illustrated in the drawing). The first communication unit 310 may be configured as a device into which the antenna, the RF circuit, the baseband circuit, the communication control circuit, and the like are integrated or a communication module substrate on which various circuits are mounted.

Examples of a communication scheme for the first communication unit 310 include Wi-Fi (trade name), Worldwide Interoperability for Microwave Access (WiMAX, trade name), Bluetooth (trade name), Bluetooth Low Energy (BLE), Digital Enhanced Cordless Telecommunications (DECT), ZigBee (trade name), and Ultra Wide Band (UWB). In the exemplary embodiment, a case will be described where the first communication unit 310 communicates wirelessly in accordance with Wi-Fi standards.

The second communication unit 320 is an interface communicating with other equipment including the HMD 100, and uses, for the wireless communication, a communication scheme different from the communication scheme for the first communication unit 310. The second communication unit 320 also includes an antenna, an RF circuit, a baseband circuit, and a communication control circuit (none of which are illustrated in the drawing).

Furthermore, examples of the communication scheme for the second communication unit 320 include Wi-Fi (trade name), Worldwide Interoperability for Microwave Access (WiMAX), BlueTooth (trade name), Bluetooth Low Energy (BLE), Digital Enhanced Cordless Telecommunications (DECT), ZigBee (trade name), and Ultra Wide Band (UWB). In the exemplary embodiment, a case will be described where the second communication unit 320 communicates wirelessly in accordance with Bluetooth standards.

The operating unit 330 includes hardware buttons that accept operations. The buttons include, e.g., a power button, a home button, and a menu button. The operating unit 330 accepts an operation of any of the buttons and then outputs, to the control unit 380, an operation signal corresponding to the button for which the operation has been accepted.

The display unit 340 includes a display panel 341 and an operation detection unit 343. The display panel 341 may be, e.g., a liquid crystal panel or an organic EL display. The display unit 340 causes Graphical User Interface (GUI) images of windows, icons, and buttons to be displayed on the display panel 341 under the control of the control unit 380. Furthermore, in a case where the control unit 380 reproduces content data 373, the display panel 341 displays an image based on the content data.

The display unit 340 includes a touch sensor detecting a touch operation. The touch sensor is arranged to overlap the display panel 341 or be integrated with the display panel 341. The operation detection unit 343 detects a touch position on the display panel 341 touched by an operator such as the finger of the guide G or a pen, based on an output from the touch sensor. The operation detection unit 343 outputs coordinate information indicating the detected touch position to the control unit 380.

The sound output unit 350 includes a D/A converter, an amplifier, and a speaker (none of which are illustrated in the drawing). The sound output unit 350 receives a sound signal from the control unit 380. The sound output unit 350 executes processing such as A/D conversion or amplification on the received sound signal to output the processed sound signal through the speaker.

The sound input unit 360 collects sound around the terminal device 300 through a built-in microphone or a microphone coupled to the sound input unit 360 via a sound terminal and executes A/D conversion, sound processing, or the like on the sound to generate a sound signal. The sound input unit 360 outputs the generated sound signal to the control unit 380.

In the exemplary embodiment, the sound input unit 360 generates the sound signal for the sound produced by the guide G and outputs the generated sound signal to the control unit 380. For example, the guide G who serves as a guide for a museum, a museum of art, or the like carries the terminal device 300 and walks around in the museum or the museum of art together with the user U to give the user U a tour of the museum or the museum of art. The guide G introduces exhibits in the museum or the museum of art to the user U. Sounds from the guide G are collected by the sound input unit 360 and input to the control unit 380 as a sound signal. The sound signal generated by the sound input unit 360 is hereinafter referred to as a second sound signal.

The storage unit 370 is a nonvolatile storage device such as a flash memory or an Electrically Erasable and Programmable Read Only Memory (EEPROM). The storage unit 370 stores a control program 371, content data 373, and coupling information 375. The control program 371 is a program executed by the control unit 380 and includes an OS and an application program.

The content data 373 is data of contents including images or video to be displayed by the display unit 340 under the control of the control unit 380. The content data 373 includes still image data, video (moving image) data, and sound data. The content data 373 may include data of a plurality of contents. Each content data 373 is provided with identification information. The identification information is identical to identification information added to content data 144 stored in a storage unit 140 (see FIG. 5) of the HMD 100. That is, the storage unit 140 of the HMD 100 and the storage unit 370 of the HMD 100 store the identical content data, and the corresponding content data 144 and content data 373 are provided with the identical identification information.

The coupling information 375 is information used to couple the terminal device 300 to an access point (not illustrated in the drawing). The coupling information 375 includes a Service Set Identifier (SSID) identifying the access point and a password. Furthermore, the coupling information 375 includes coupling information used to implement Bluetooth communication. Specifically, the coupling information includes code information such as a PIN code and passkey.

The control unit 380 includes, as hardware, a Central Processing Unit (CPU), a Read Only Memory (ROM), and a Random Access Memory (RAM).

The CPU loads, into the RAM, various control programs stored in the storage unit 370 and executes the control programs and thus various processes. The number of CPUs is not limited to one, and the terminal device 300 may be configured to include a plurality of CPUs. The ROM stores control programs such as the OS. The RAM is used as a memory for CPU calculations.

The control unit 380 includes, as functional blocks, a communication control unit 381 and an application execution unit 383. The functional blocks are functions implemented by the CPU by executing the control program 371 and represented as blocks for convenience. The functional blocks do not mean particular applications or hardware.

The communication control unit 381 controls the first communication unit 310 and the second communication unit 320 to implement wireless communication with other equipment including the HMD 100.

The communication control unit 381 controls the first communication unit 310 to establish a connection to an access point (not illustrated in the drawing). When attempting to establish a connection to the access point, the communication control unit 381 causes the SSID and the password included in the coupling information 375 to be read from the storage unit 370 and transmitted to the access point, in response to a request transmitted from the access point. Once the connection to the access point is established, the communication control unit 381 communicates wirelessly based on Wi-Fi with other equipment such as the HMD 100 which have also coupled to the access point.

Furthermore, the communication control unit 381 controls the second communication unit 320 to establish Bluetooth communication with other equipment including the HMD 100. For example, when receiving a pairing request from the HMD 100 while an operating mode of the terminal device 300 is a paring mode, the communication control unit 381 transmits information needed for pairing to the HMD 100. The communication control unit 381 then authenticates the HMD 100, while the HMD 100 authenticates the terminal device 300, in accordance with a prescribed authentication scheme. The communication control unit 381 stores, in the storage unit 370, information about the HMD 100, paired with the terminal device 300, thus completing the pairing.

Furthermore, the communication control unit 381 accepts selection of the content data 373 and a reproduction instruction from the operating unit 330, and then causes the first communication unit 310 to transmit, to the HMD 100, the reproduction instruction including the identification information of the selected content data 373.

When receiving the second sound signal from the sound input unit 360, the communication control unit 381 executes processing such as encoding on the received second sound signal to convert the second sound signal into sound data in a format in which the data can be communicated. The communication control unit 381 causes the second communication unit 320 to transmit the resultant sound data to the HMD 100. The sound data corresponds to the "second sound signal" according to the invention.

The application execution unit 383 is a functional block implemented by executing an application program included in the control program 371. For example, for execution of an application program for moving-image reproduction, the application execution unit 383 reproduces the content data 373 stored in the storage unit 370 and causes the display panel 341 to display images based on a video signal included in the content data 373. The application execution unit 383 also causes the sound output unit 350 to output sound based on the sound signal included in the content data 373.

Configuration of HMD 100

Figure 3:
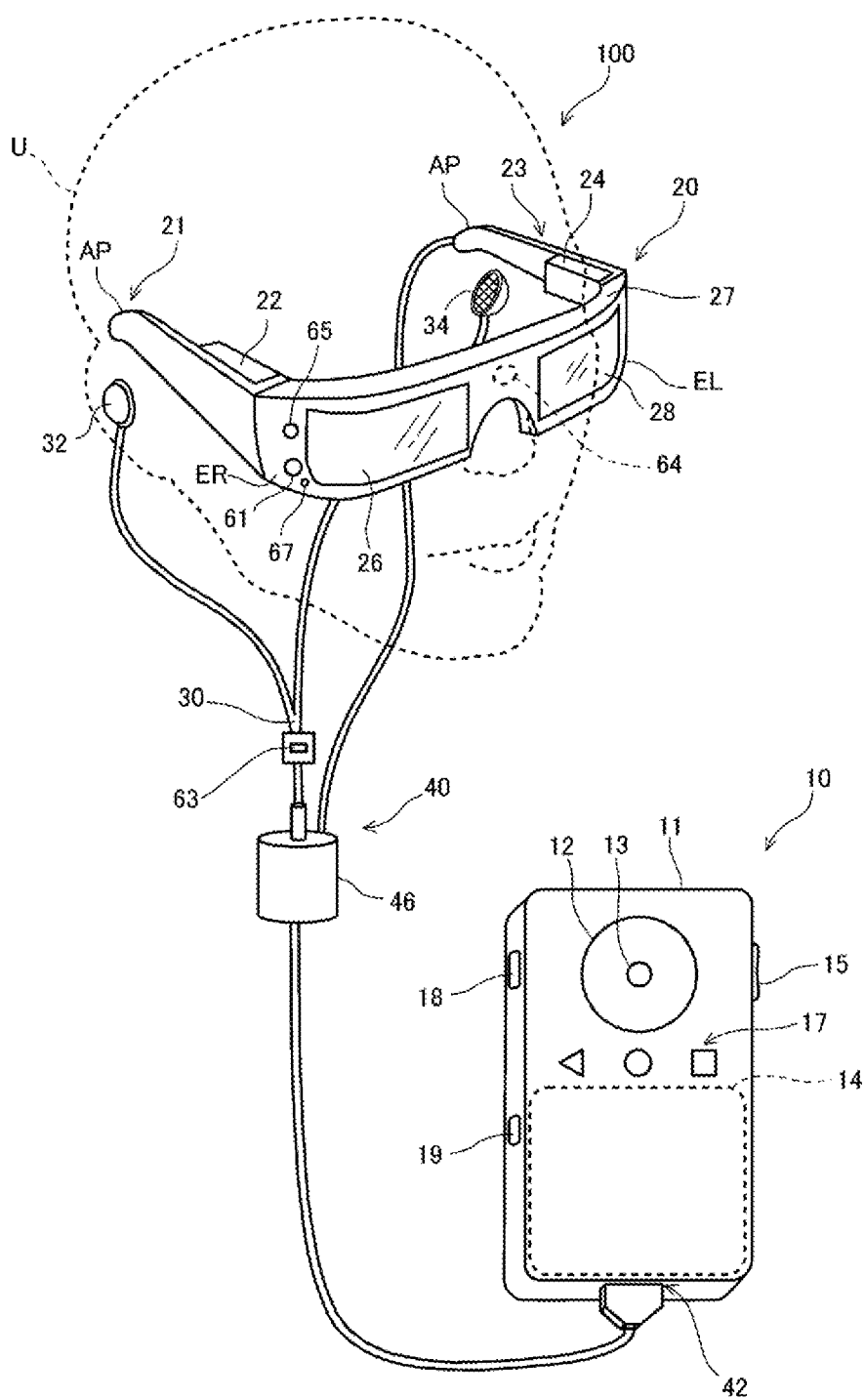
FIG. 3 is a diagram illustrating an external configuration of an HMD.

FIG. 3 is a diagram illustrating an external configuration of the HMD 100.

The HMD 100 includes an image display unit 20 mounted on the head of the user U, and a controller 10 controlling the image display unit 20. The image display unit 20 is a functional unit performing operations corresponding to the "display unit" according to the invention, to allow the user U to visually recognize virtual images while mounted on the head of the user U. The controller 10 also functions as a control device used by the user U to operate the HMD 100.

The controller 10 includes a box-shaped main body 11 provided with various switches, an operation pad 14, and the like that accept operations of the user U. The image display unit 20 is shaped like eyeglasses in the exemplary embodiment, and includes a main body with a right holding unit 21, a left holding unit 23, and a front frame 27. The main body also includes a right display unit 22, a left display unit 24, a right light guide plate 26, and a left light guide plate 28.

The right holding unit 21 and the left holding unit 23 extend rearward from respective ends of the front frame 27 to hold the image display unit 20 on the head of the user U. An end ER is defined as one of the ends of the front frame 27 positioned on a right side of the user U when the image display unit 20 is mounted on the user U. An end EL is defined as the other end of the front frame 27 positioned on a left side of the user U when the image display unit 20 is mounted on the user U.

The right light guide plate 26 and the left light guide plate 28 are provided in the front frame 27. With the image display unit 20 mounted on the user U, the right light guide plate 26 is positioned in front of the right eye of the user U, and the left light guide plate 28 is positioned in front of the left eye of the user U.

The right display unit 22 and the left display unit 24 are each a module in which an optical unit and a peripheral circuit are integrated into a single unit. The right display unit 22 and the left display unit 24 each emit image light. The right display unit 22 is attached to the right holding unit 21, and the left display unit 24 is attached to the left holding unit 23.

The right light guide plate 26 and the left light guide plate 28 are each an optical component formed of a light transmissive resin or the like. For example, the right light guide plate 26 and the left light guide plate 28 are each a prism. The right light guide plate 26 guides, toward the right eye of the user U, image light output by the right display unit 22. The left light guide plate 28 guides, toward the left eye of the user U, image light output by the left display unit 24. This causes the image light to enter both eyes of the user U, who can visually recognize the image.

The HMD 100 is a see-through display device, and the image light guided by the right light guide plate 26 and outside light transmitted through the right light guide plate 26 enter the right eye RE of the user U. Similarly, the image light guided by the left light guide plate 28 and outside light transmitted through the left light guide plate 28 enter the left eye LE of the user U. In this way, the HMD 100 causes the outside light and the image light corresponding to the internally processed image to enter the eyes of the user U such that the outside light and the image light are superimposed on each other. The outside scenery is visually recognized by the user U through the right light guide plate 26 and the left light guide plate 28, and the image based on the image light is visually recognized in such a manner as to be superimposed on the outside scenery.

An illuminance sensor 65 is arranged in the front frame 27 of the image display unit 20. The illuminance sensor 65 receives outside light from the front of the user U with the image display unit 20 mounted on the head of the user U.

A camera 61 is disposed in the front frame 27 of the image display unit 20. An imaging range and an imaging direction of the camera 61 will be described below. The camera 61 is provided at a position where the camera avoids blocking the outside light transmitted through the right light guide plate 26 and the left light guide plate 28. In an example in FIG. 2, the camera 61 is arranged on the end ER side of the front frame 27 but may be arranged on the end EL side or at a joining portion between the right light guide plate 26 and the left light guide plate 28.

The camera 61 is a digital camera including an imaging element such as a CCD or a CMOS and an imaging lens. The camera 61 according to the exemplary embodiment is a monocular camera but may be configured as a stereo camera. The camera 61 images at least a part of the outside scenery (real space) in a visual-field direction of the user U with the HMD 100 mounted on the head of the user U. An angle of view of the camera 61 faces a front direction of the user U and overlaps the outside scenery visually recognized by the user U through the image display unit 20. The angle of view of the camera 61 more preferably includes the entire field of view that can be visually recognized by the user U through the image display unit 20. The camera 61 executes imaging under the control of a control unit 150 to output captured image data to the control unit 150.

An LED indicator 67 is arranged in the front frame 27. The LED indicator 67 is arranged at the end ER near the camera 61 and is lighted during operation of the camera 61 to notify the user that imaging is in execution.

A distance sensor 64 is provided in the front frame 27. The distance sensor 64 detects a distance to a to-be-measured object positioned in a preset measurement direction. In the exemplary embodiment, the distance sensor 64 detects the distance to the to-be-measured object positioned in front of the user U. The distance sensor 64 may be, e.g., a light reflective distance sensor including a light source such as an LED or a laser diode and a light receiving unit receiving light emitted by the light source and reflected by the to-be-measured object. Alternatively, the distance sensor 64 may be an ultrasonic distance sensor including a sound source emitting an ultrasonic wave and a detection unit receiving the ultrasonic wave reflected by the to-be-measured object. Alternatively, the distance sensor 64 may be a laser range scanner (region measurement sensor). In this case, region measurement may be performed over a wide area including the front of the image display unit 20.

The controller 10 and the image display unit 20 are coupled together by a connection cable 40. The connection cable 40 is removably coupled to a connector 42 of the main body 11.

The connection cable 40 includes an audio connector 46, and a headset 30 is coupled to the audio connector 46; the head set 30 includes a right earphone 32 and a left earphone 34 included in a stereo headphone, and a microphone 63. The right earphone 32 is inserted in the right ear of the user U, and the left earphone 34 is inserted in the left ear of the user U. The right earphone 32 and the left earphone 34 are a functional unit corresponding to the "sound output unit" according to the invention.

Figure 4:
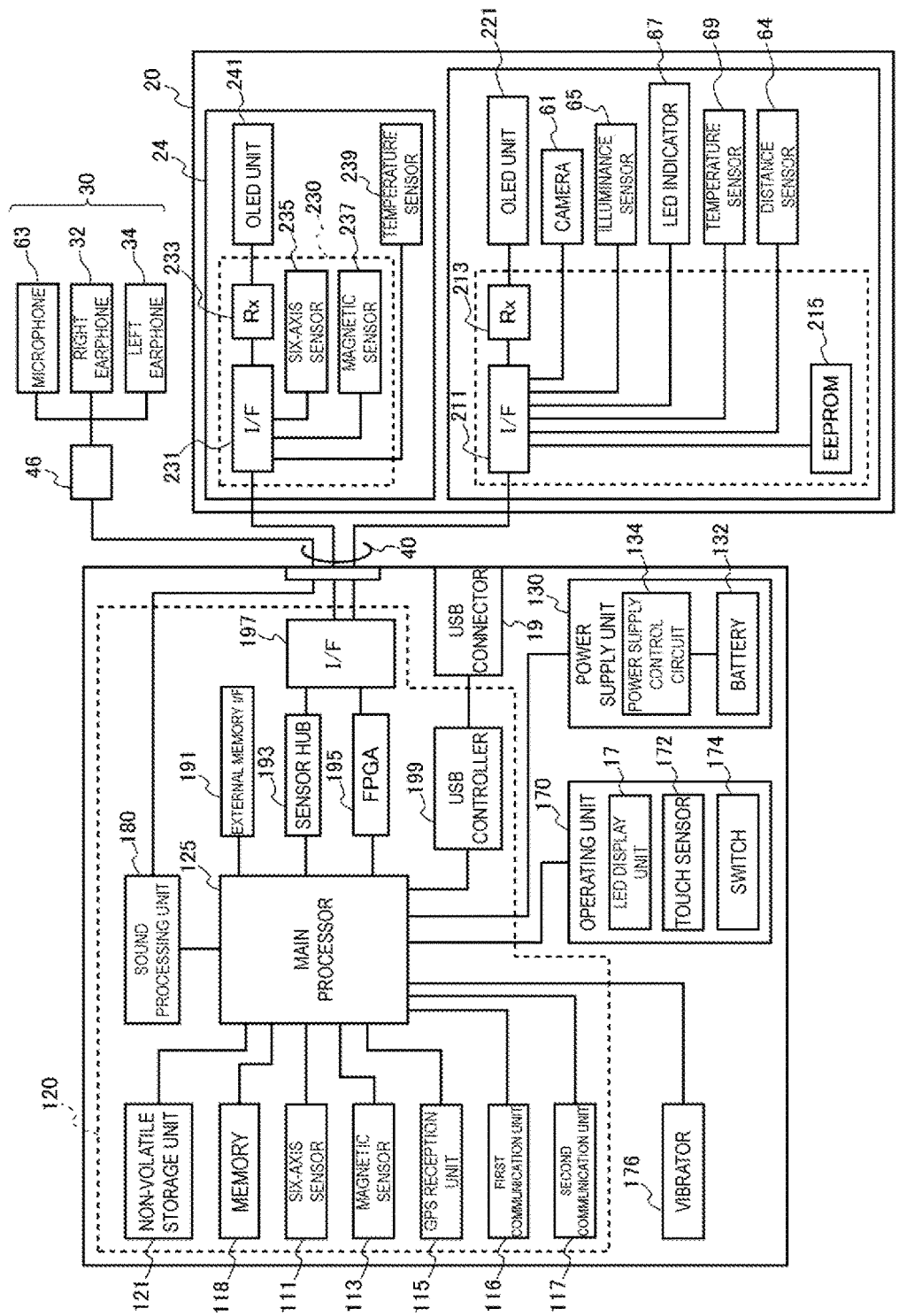
FIG. 4 is a block diagram of the HMD.

The microphone 63 collects sound to output a sound signal to a sound processing unit 180 (FIG. 4). The microphone 63 may be, e.g., a monaural microphone or a stereo microphone, or a directional microphone or a nondirectional microphone.

The controller 10 includes, as operated units operated by the user U, a wheel operating unit 12, a central key 13, an operation pad 14, up-down keys 15, an LED display unit 17, and a power switch 18. The operated units are arranged on a front surface of the main body 11. The operated units are operated by, e.g., the fingers of the user U.

The operation pad 14 includes an operation surface detecting a touch operation to output an operation signal in response to an operation on the operation surface. A detection method for the operation surface is not limited, and electrostatic detection, pressure detection, optical detection, or the like may be adopted. Touching of the operation pad 14 (touch operation) is detected, for example, by a touch sensor (not illustrated in the drawing). The operation pad 14 outputs, to the control unit 150, a signal indicating a position on the operation surface where the touch has been detected.

The Light Emitting Diode (LED) display unit 17 is installed in the main body 11. The LED display unit 17 includes a transmission portion (not illustrated in the drawing) enabling light to pass through. An LED installed immediately below the transmission portion is lighted such that characters, symbols, patterns, or the like formed in the transmission portion are visually recognizable. An operation of touching the LED display unit 17 with the finger of the user U is detected by a touch sensor 172 (FIG. 4). Thus, a combination of the LED display unit 17 and the touch sensor 172 functions as a software key.

The power switch 18 is a switch for switching on and off power of the HMD 100. Furthermore, the main body 11 includes a Universal Serial Bus (USB) connector 19 as an interface coupling the controller 10 to an external device.

Configuration of HMD

FIG. 4 is a block diagram illustrating a configuration of the units included in the HMD 100.

The controller 10 includes a main processor 125 executing programs to control the HMD 100. The main processor 125 couples to a memory 118 and a nonvolatile storage unit 121. The main processor 125 couples to an operating unit 170 serving as an input device. The main processor 125 also couples to sensors including a six-axis sensor 111, a magnetic sensor 113, and a GPS 115.

The main processor 125 couples to a first communication unit 116, a second communication unit 117, a sound processing unit 180, an external memory interface 191, a USB connector 19, a sensor hub 193, and an FPGA 195. These components function as interfaces with external equipment.

The main processor 125 is mounted on a controller substrate 120 built into the controller 10. In the exemplary embodiment, mounted on the controller substrate 120 are the six-axis sensor 111, the magnetic sensor 113, the GPS 115, the first communication unit 116, the second communication unit 117, the memory 118, the nonvolatile storage unit 121, the sound processing unit 180, and the like. Moreover, on the controller substrate 120, the external memory interface 191, the USB connector 19, the sensor hub 193, the FPGA 195, and an interface 197 may be mounted. On the controller substrate 120, the connector 42 and the USB connector 19 may be mounted.

The memory 118 forms a work area where programs to be executed by the main processor 125, data processed by the main processor 125, and the like are temporarily stored. The nonvolatile storage unit 121 includes a flash memory or an embedded Multi Media Card (eMMC). The nonvolatile storage unit 121 stores the programs to be executed by the main processor 125 and the data to be processed by the main processor 125.

The operating unit 170 includes the LED display unit 17, the touch sensor 172, and the switch 174. The touch sensor 172 detects a touch operation performed by the user U to determine an operation position and outputs an operation signal to the main processor 125. The switch 174 outputs the operation signal to the main processor 125 in response to an operation of either of the up-down keys 15 and the power switch 18. The LED display unit 17 turns on and off the LED or blinks the LED under the control of the main processor 125. The operating unit 170 is, e.g., a switch substrate on which the LED display unit 17, the touch sensor 172, the switch 174, and a circuit controlling the LED display unit 17, the touch sensor 172, and the switch 174 are mounted. The operating unit 170 is housed in the main body 11. The operating unit 170 is a functional unit corresponding to the "user interface unit" according to the invention.

The six-axis sensor 111 is an example of a motion sensor (inertia sensor) detecting a motion of the controller 10. The six-axis sensor 111 includes a three-axis accelerometer and a three-axis gyro (angular velocity) sensor. An Inertial Measurement Unit (IMU) including the above-described sensors as modules may be adopted as the six-axis sensor 111.

The magnetic sensor 113 is a three-axis geomagnetic sensor, for example.

The Global Positioning System (GPS) 115 is a receiver including a GPS antenna not illustrated in the drawing, to receive wireless signals transmitted from a GPS satellite. The GPS 115 detects and calculates coordinates of a current position of the controller 10, based on a GPS signal.

The six-axis sensor 111, the magnetic sensor 113, and the GPS 115 output values to the main processor 125 in accordance with a pre-specified sampling period. Furthermore, the six-axis sensor 111, the magnetic sensor 113, and the GPS 115 may be configured to output detected values to the main processor 125 at timings specified by the main processor 125 in accordance with a request made by the main processor 125.

The first communication unit 116 is a communication device communicating wirelessly with external equipment including the terminal device 300. The first communication unit 116 includes an antenna, an RF circuit, a baseband circuit, and a communication control circuit none of which are illustrated in the drawing. The first communication unit 116 may be a device into which the antenna, the RF circuit, the baseband circuit, the communication control circuit, and the like are integrated or a communication module substrate on which various circuits are mounted.

Examples of a communication scheme for the first communication unit 116 include Wi-Fi (trade name), Worldwide Interoperability for Microwave Access (WiMAX, trade name), Bluetooth (trade name), Bluetooth Low Energy (BLE), Digital Enhanced Cordless Telecommunications (DECT), ZigBee (trade name), and Ultra Wide Band (UWB). In the exemplary embodiment, a case will be described where the first communication unit 116 communicates wirelessly in accordance with the Wi-Fi standards. That is, the first communication unit 116 transmits and receives data to and from the first communication unit 310 of the terminal device 300.

The second communication unit 117 is an interface communicating with other equipment including the HMD 100, and uses, for the wireless communication, a communication scheme different from the communication scheme for the first communication unit 116. The second communication unit 117 also includes an antenna, an RF circuit, a baseband circuit, and a communication control circuit (none of which are illustrated in the drawing).

Furthermore, examples of the communication scheme for the second communication unit 117 include Wi-Fi (trade name), Worldwide Interoperability for Microwave Access (WiMAX, trade name), BlueTooth (trade name), Bluetooth Low Energy (BLE), Digital Enhanced Cordless Telecommunications (DECT), ZigBee (trade name), and Ultra Wide Band (UWB). In the exemplary embodiment, a case will be described where the second communication unit 117 communicates wirelessly in accordance with Bluetooth standards. That is, the second communication unit 117 transmits and receives data to and from the second communication unit 320 of the terminal device 300.

The sound processing unit 180 is coupled to the audio connector 46 (FIG. 4) to receive and output sound signals and to encode/decode the sound signals. The sound processing unit 180 also includes an A/D converter converting an analog sound signal into a digital sound signal and a D/A converter executing a reverse conversion.

The external memory interface 191 is an interface to which a portable memory device may be coupled, and includes, e.g., an interface circuit and a memory card slot into which a card-type recording medium is installed to enable data to be read from the recording medium.

The controller 10 is equipped with a vibrator 176. The vibrator 176 includes a motor (not illustrated) and an eccentric rotor (not illustrated) to vibrate under the control of the main processor 125. For example, the vibrator 176 vibrates in a prescribed vibration pattern in response to an operation on the operating unit 170 or turn-on/off of the power of the HMD 100.

The interface (I/F) 197 couples the sensor hub 193 and the Field Programmable Gate Array (FPGA) 195 to the image display unit 20.

The sensor hub 193 acquires detected values from the various sensors provided in the image display unit 20 to output the detected values to the main processor 125. The FPGA 195 processes data transmitted and received between the main processor 125 and each unit of the image display unit 20 and transmits data via the interface 197.

The connection cable 40 and wiring (not illustrated) inside the image display unit 20 individually couple the right display unit 22 and the left display unit 24 to the controller 10.

The right display unit 22 includes an Organic Light Emitting Diode (OLED) unit 221 emitting image light. The image light emitted by the OLED unit 221 is guided to the right light guide plate 26 by an optical system including a lens group. The left display unit 24 includes an OLED unit 241 emitting image light. The image light emitted by the OLED unit 241 is guided to the left light guide plate 28 by an optical system including a lens group.

Each of the OLED units 221 and 241 includes an OLED panel and a drive circuit driving the OLED panel. The OLED panel is a self-luminous display panel configured by light emitting elements arranged in a matrix and emitting color light in red (R), green (G), and blue (B) as a result of organic electroluminescence. The OLED panel includes a plurality of pixels each including an R element, a G element, and a B element forming one pixel. An image is formed of pixels arranged in a matrix. The drive circuit selects light emitting elements of the OLED panel and passes a current through the light emitting elements according to the control of the control unit 150 to cause the light emitting elements in the OLED panel to emit light. Thus, image light of an image formed in the OLED unit 221 and image light of an image formed in the OLED unit 241 are respectively guided to the right light guide plate 26 and the left light guide plate 28 and enter the right eye RE and the left eye LE.

The right display unit 22 includes a display unit substrate 210. Mounted on the display unit substrate 210 are an interface (I/F) 211 coupled to the interface 197, a reception unit (Rx) 213 receiving data from the controller 10 via the interface 211, and an EEPROM 215. The interface 211 couples the reception unit 213, the EEPROM 215, the temperature sensor 69, the camera 61, the illuminance sensor 65, and the LED indicator 67 to the controller 10.

The Electrically Erasable Programmable Read-Only Memory (EEPROM) 215 stores data such that the main processor 125 may read the data. The EEPROM 215 stores, e.g., data about emission characteristics and display characteristics of the OLED units 221 and 241 included in the image display unit 20 and data about characteristics of the sensors included in the right display unit 22 or the left display unit 24. Specifically, the EEPROM 215 stores parameters for gamma correction for the OLED units 221 and 241, data used to compensate for detected values from the temperature sensors 69 and 239, and the like. These data are generated through inspection prior to factory shipment of the HMD 100 and written to the EEPROM 215. After the shipment, the main processor 125 may utilize the data in the EEPROM 215 to execute processing.

The camera 61 executes imaging in accordance with a signal received via the interface 211 to output captured image data, or a signal indicating an imaging result to the interface 211.

The illuminance sensor 65 outputs, to the interface 211, a detected value corresponding to the amount of light received (light reception intensity). The LED indicator 67 is turned on and off in accordance with a signal received via the interface 211.

The temperature sensor 69 detects a temperature to output a voltage value or a resistance value corresponding to the detected temperature, to the interface 211 as a detected value. The temperature sensor 69 is mounted on a back side of the OLED panel of the OLED unit 221 or on a substrate that is a substrate for the drive circuit driving the OLED panel, to detect the temperature of the OLED panel. Furthermore, in a case where the OLED panel is implemented as an integrated circuit with the drive circuit on an integrated semiconductor chip, as an Si-OLED, the temperature sensor 69 may be mounted on the semiconductor chip.

The reception unit 213 receives, via the interface 211, data transmitted by the main processor 125. In a case of receiving image data from the interface 211, the reception unit 213 outputs the received image data to the OLED unit 221.

The left display unit 24 includes a display unit substrate 230. Mounted on the display unit substrate 230 are an interface (I/F) 231 coupled to the interface 197 and a reception unit (Rx) 233 receiving data from the controller 10 via the interface 231. On the display unit substrate 230, a six-axis sensor 235 and a magnetic sensor 237 are mounted. The interface 231 couples the reception unit 233, the six-axis sensor 235, the magnetic sensor 237, and the temperature sensor 239 to the controller 10.

The six-axis sensor 235 is an example of a motion sensor detecting a motion of the image display unit 20. The six-axis sensor 235 includes a three-axis accelerometer and a three-axis gyro sensor. The six-axis sensor 235 may be an Inertial Measurement Unit (IMU) including the above-described sensors as modules. The magnetic sensor 237 is a three-axis geomagnetic sensor, for example.

The temperature sensor 239 detects a temperature to output a voltage value or a resistance value corresponding to the detected temperature, to the interface 231 as a detected value. The temperature sensor 239 is mounted on a back side of the OLED panel of the OLED unit 241 or on a substrate that is a substrate for the drive circuit driving the OLED panel, to detect the temperature of the OLED panel. Furthermore, in a case where the OLED panel is implemented as an integrated circuit with the drive circuit on an integrated semiconductor chip, as an Si-OLED, the temperature sensor 239 may be mounted on the semiconductor chip.

The sensor hub 193 of the controller 10 connects to the camera 61, the illuminance sensor 65, the temperature sensor 69, the six-axis sensor 235, the magnetic sensor 237, and the temperature sensor 239.

The sensor hub 193 sets a sampling period for each of the sensors and initializes the sensors, under the control of the main processor 125. The sensor hub 193, e.g., passes a current through each sensor, transmits control data to the sensor, and acquires a detected value from the sensor, in accordance with the sampling period for the sensor. The sensor hub 193 also outputs the detected value from each sensor to the main processor 125 at a preset timing. The sensor hub 193 may include a function to temporarily hold the detected value from each sensor in accordance with a timing for output to the main processor 125. The sensor hub 193 may also include a function to accommodate differences in signal format or data format among output values from the sensors and to convert each of the output values into data in a unified data format to output the data to the main processor 125.

The sensor hub 193 also starts and stops passing a current through the LED indicator 67 under the control of the main processor 125 to light or blink the LED indicator 67 in accordance with timings when the camera 61 starts and ends imaging.

The controller 10 includes a power supply unit 130 and is operated by power supplied by the power supply unit 130. The power supply unit 130 includes a chargeable battery 132 and a power supply control circuit 134 detecting a remaining capacity of the battery 132 and controlling charging of the battery 132.

A USB controller 199 functions as a USB device controller and establishes communication with a USB host device coupled to the USB connector 19 for data communication. In addition to serving as a USB device controller, the USB controller 199 may also serve as a USB host controller.

Configuration of HMD Control System

Figure 5:
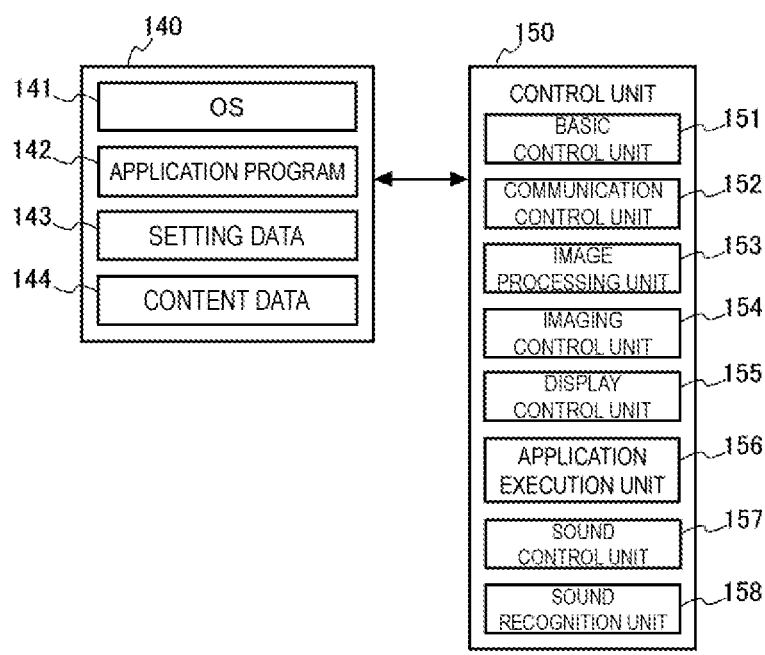
FIG. 5 is a functional block diagram of a control unit and a storage unit of the HMD.

FIG. 5 is a functional block diagram of the storage unit 140 and the control unit 150 included in a control system of the controller 10 of the HMD 100. The storage unit 140 illustrated in FIG. 5 is a logical storage unit including the nonvolatile storage unit 121 (FIG. 4) and may include the EEPROM 215. The control unit 150 and various functional units of the control unit 150 are formed by the main processor 125 by executing corresponding programs, i.e., by cooperation of software and hardware. The control unit 150 and the various functional units included in the control unit 150 are configured, for example, by the main processor 125, the memory 118, and the nonvolatile storage unit 121.

The storage unit 140 stores various programs to be executed by the main processor 125 and the data to be processed by the main processor 125. The storage unit 140 stores an operating system (OS) 141, an application program 142, setting data 143, and the content data 144.

The control unit 150 executes the programs stored in the storage unit 140 to process the data stored in the storage unit 140, thus controlling the HMD 100.

The operating system 141 is a basic control program for the HMD 100 executed by the main processor 125. The main processor 125 loads and executes the operating system 141 when the power switch 18 is operated to switch on the power of the HMD 100. The main processor 125 executes the operating system 141 to implement the various functions of the control unit 150. The functions of the control unit 150 include a basic control unit 151, a communication control unit 152, an image processing unit 153, an imaging control unit 154, a display control unit 155, an application execution unit 156, a sound control unit 157, and a sound recognition unit 158.

The application program 142 is a program executed by the main processor 125 while the main processor 125 is executing the operating system 141. The application program 142 utilizes the various functions of the control unit 150. The storage unit 140 may store not only one application program 142 but also a plurality of application programs 142. For example, the application program 142 implements functions such as image content reproduction, sound content reproduction, gaming, camera image capturing, documentation, web browsing, schedule management, telephone (including sound communication), image communication, and route navigation.

The setting data 143 includes various set values for operations of the HMD 100. Furthermore, in a case where the control unit 150 uses parameters, determinants, arithmetic expressions, LookUp Tables (LUTs), or the like to control the HMD 100, such information may be included in the setting data 143.

The setting data 143 also includes data used to execute the application program 142. Specifically, the setting data 143 includes data such as execution conditions for execution of various programs included in the application program 142. For example, the setting data 143 includes data indicating an image display size and a direction of a screen used when the application program 142 is executed, and the functional units of the control unit 150 or the sensors of the HMD 100 used by the application program 142.

In the HMD 100, when the application program 142 is installed, an installation process is executed by a function of the control unit 150. The installation process is a process including not only storing the application program 142 in the storage unit 140 but also setting the execution conditions or the like for the application program 142. When the installation process causes the setting data 143 corresponding to the application program 142 to be generated or stored in the storage unit 140, the application execution unit 156 may start the application program 142.

The content data 144 is data of contents including images or video to be displayed by the image display unit 20 under the control of the control unit 150. The content data 144 includes still image data, video (moving image) data, and sound data. The content data 144 may include data of a plurality of contents. The content data 144 may be data of bidirectional contents. Each content data 144 is provided with identification information. The identification information is identical to the identification information added to the content data 373 stored in the storage unit 370 of the terminal device 300. The storage unit 140 of the HMD 100 and the storage unit 370 of the HMD 100 store the identical content data, and the corresponding content data 144 and content data 373 are provided with the identical identification information.

The basic control unit 151 executes a basic function to control each unit of the HMD 100. The basic control unit 151 executes a startup process when the HMD 100 is powered on, to initialize each unit of the HMD 100 to enable the application execution unit 156 to execute the application program 142. The basic control unit 151 executes a shutdown process when the controller 10 is to be powered off, to shut down the application execution unit 156, update the various data stored in the storage unit 140, and stop the HMD 100. The shutdown process includes stopping the power supply to the image display unit 20 to shut down the HMD 100 as a whole.

The basic control unit 151 includes a function to control the power supply by the power supply unit 130. The basic control unit 151 individually switches off the power supply from the power supply unit 130 to the units of the HMD 100 in the shutdown process.

The communication control unit 152 controls the communication functions of the first communication unit 116 and the second communication unit 117 to perform data communication with the terminal device 300.

The communication control unit 152 uses the first communication unit 116 to receive a reproduction instruction including the identification information of the content data 144. The communication control unit 152 also uses the second communication unit 117 to receive sound data transmitted from the terminal device 300. The communication control unit 152 executes processing such as decoding on the sound data received by the second communication unit 117 to extract the second sound signal. The communication control unit 152 outputs the extracted second sound signal to the sound control unit 157.

Functions of the communication control unit 152 allow the basic control unit 151 and the application execution unit 156 to transmit and receive data to and from any other device to, e.g., utilize the received data.

The image processing unit 153 generates signals to be transmitted to the right display unit 22 and the left display unit 24, based on image data of images or video to be displayed by the image display unit 20. The signals generated by the image processing unit 153 may be vertical synchronizing signals, horizontal synchronizing signals, clock signals, analog image signals, or the like. The image processing unit 153 may execute a resolution conversion process for converting a resolution of the image data into a resolution suitable for the right display unit 22 and the left display unit 24, as necessary. The image processing unit 153 may also execute an image adjustment process for adjusting luminance or saturation of the image data, a 2D/3D conversion process for generating 2D image data from 3D image data or generating 3D image data from 2D image data, or the like. In a case of executing the above-described image processing, the image processing unit 153 generates a signal for displaying an image based on the processed image data and transmits the signal to the image display unit 20.

The image processing unit 153 may be configured to be implemented by the main processor 125 by executing the operating system 141 or may be configured by hardware different from the main processor 125. The hardware may be, e.g., a Digital Signal Processor (DSP).

The imaging control unit 154 controls the camera 61 to cause the camera 61 to execute imaging to generate captured image data, and temporarily stores the captured image data in the storage unit 140. Furthermore, in a case where the camera 61 is configured as a camera unit including a circuit for generating captured image data, the imaging control unit 154 acquires the captured image data from the camera 61 to temporarily store the captured image data in the storage unit 140.

The display control unit 155 generates control signals for controlling the right display unit 22 and the left display unit 24 to control generation and emission of image light executed by each of the right display unit 22 and the left display unit 24. For example, the display control unit 155 causes the OLED panel to display an image and controls, e.g., drawing timings for the OLED panel and luminance.

The application execution unit 156 corresponds to a function to cause the main processor 125 to execute the application program 142 while executing the operating system 141. The application execution unit 156 executes the application program 142 to implement the various functions of the application program 142. The functions of the application program 142 are as described above. The application execution unit 156 utilizes the functions of the units of the control unit 150 while executing the application program 142.

The application execution unit 156 also receives the reproduction instruction including the identification information transmitted from the terminal device 300. When receiving, from the terminal device 300, the reproduction instruction including the identification information, the first communication unit 116 outputs the received reproduction instruction to the control unit 150. When receiving the reproduction instruction, the application execution unit 156 retrieves the identification information included in the reproduction instruction to acquire, from the storage unit 140, the content data 144 corresponding to the identification information. In other words, the application execution unit 156 performs operations corresponding to the "acquisition unit" according to the invention. The application execution unit 156 retrieves sound data included in the read content data 144 to output the sound data to the sound control unit 157. The application execution unit 156 also causes the image processing unit 153 to process the image data of images or video included in the content data 144.

The HMD 100 includes a first sound mode and a second sound mode as sound modes. The first sound mode is a mode in which different sound signals are output from a right channel and a left channel. In a case where the sound mode is the first sound mode, a first sound signal and a second sound signal are output. The right channel is a channel for the right ear, outputting sound signals to the right earphone 32 of the headset 30. The left channel is a channel for the left ear, outputting sound signals to the left earphone 34 of the headset 30. Furthermore, the second sound mode is a mode in which one sound signal is output to any of the right channel, the left channel, and both the right and left channels. In a case where the sound mode is the second sound mode, one of the first sound signal and the second sound signal is output.

In the case where the sound mode is the first sound mode, the sound control unit 157 controls the sound processing unit 180 to cause the right earphone 32 and the left earphone 34 to output sound signals for different sounds. Furthermore, in the case where the sound mode is the second sound mode, the sound control unit 157 controls the sound processing unit 180 to cause one of the right earphone 32, the left earphone 34, and both the right and left earphones to output one sound signal.

In a case where the second communication unit 117 receives sound data of a sound produced by the guide G while the application execution unit 156 is reproducing the content data 144, the sound control unit 157 changes the sound mode from the second sound mode to the first sound mode. Furthermore, in a case where the second communication unit 117 fails to receive the sound data from the guide G even though the application execution unit 156 is reproducing the content data 144, the sound control unit 157 avoids changing the sound mode and maintains the second sound mode. In addition to these processes, the sound control unit 157 may switch between the first sound mode and the second sound mode in response to the operation on the operating unit 170.

In a case where the second communication unit 117 receives sound data, the sound control unit 157 receives the second sound signal. The sound control unit 157 also receives sound data acquired from the content data 144 by the application execution unit 156. The sound control unit 157 processes the received sound data to generate a sound signal. Sound based on the sound data acquired from the content data 144 corresponds to a "sound associated with a displayed image" according to the invention. The sound signal retrieved from the sound data acquired from the content data 144 is hereinafter referred to as the first sound signal. Other examples of the sound signal for the sound associated with the displayed image include live video and television images.

The sound control unit 157 converts a frequency of the sound signal as needed. For example, in a case where the frequency of the first sound signal is not equal to the frequency of the second sound signal, the sound control unit 157 re-samples the first sound signal to equalize the frequency of the first sound signal with the frequency of the second sound signal. In a case where the frequency of the first sound signal is equal to the frequency of the second sound signal, the sound control unit 157 executes no frequency conversion. In a case where the frequency of the first sound signal is equalized with the frequency of the second sound signal through re-sampling, output levels of the first sound signal and the second sound signal may be easily adjusted, e.g., allowing both the first sound signal and the second sound signal to be muted by a single operation.

In the case where the sound mode is the first sound mode, the sound control unit 157 outputs the first sound signal and the second sound signal to the sound processing unit 180. In the case where the sound mode is the second sound mode, the sound control unit 157 outputs one of the first sound signal and the second sound signal to the sound processing unit 180.

The sound recognition unit 158 executes a sound recognition process on the second sound signal received by the second communication unit 117, to generate text data. The sound recognition unit 158 outputs the generated text data to the display control unit 155. The display control unit 155 controls the image display unit 20 to cause the text data to be displayed in a display area VR.

Configuration of Sound Processing System of HMD

Figure 6:
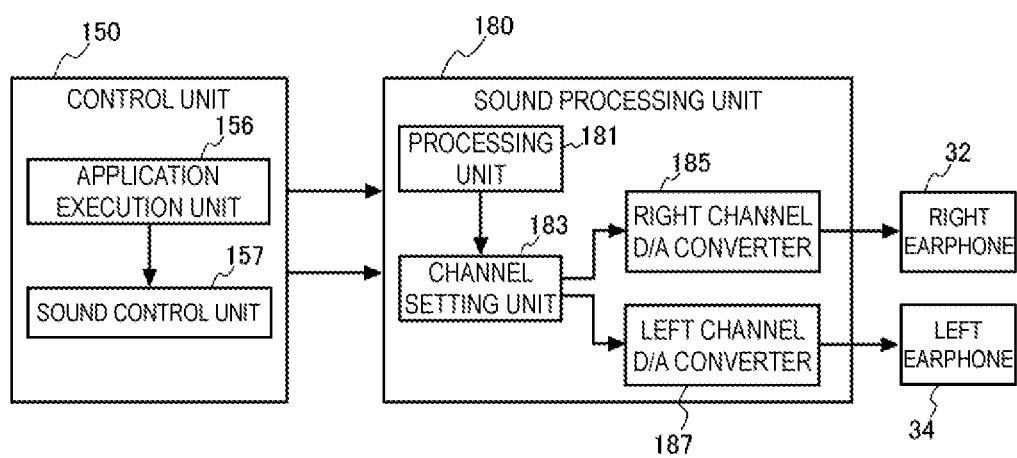
FIG. 6 is a diagram illustrating a configuration of a sound processing system of the HMD.

FIG. 6 is a diagram illustrating a configuration of a sound processing system of the HMD 100.

The sound processing unit 180 includes a processing unit 181, a channel setting unit 183, a right channel D/A converter 185, and a left channel D/A converter 187.

The processing unit 181 adjusts a volume of a received sound signal, i.e., executes an amplification process for the sound signal and the like. In a case of receiving the first sound signal and the second sound signal from the control unit 150, the processing unit 181 adjusts the volume of at least one of the first sound signal and the second sound signal. For example, in a case where a difference in volume between the first sound signal and the second sound signal is a prescribed value or larger, the processing unit 181 amplifies one of the sound signals to adjust the difference in volume to the prescribed value or lower.

In the case where the sound mode is the first sound mode, the processing unit 181 receives the first sound signal and the second sound signal. In the case where the sound mode is the first sound mode and the first sound signal included in the content data 144 is a stereo signal, the sound control unit 157 causes the processing unit 181 to convert the signal format of the first sound signal. The processing unit 181 converts the signal format of the first sound signal into a monaural format under the control of the sound control unit 157. In a case where the first sound signal is a stereo signal, the processing unit 181 cuts an output (sound signal) from one of the right channel and the left channel and provides an output (sound signal) from the other channel to the channel setting unit 183.

In the case where the sound mode is the second sound mode, the processing unit 181 receives one of the first sound signal and the second sound signal. In the case where the sound mode is the second sound mode, the processing unit 181 outputs received sound signal among the first sound signal and the second sound signal to the channel setting unit 183.

The processing unit 181 adjusts the volume of the received sound signal under the control of the sound control unit 157.

In the case where the sound mode is the first sound mode, the sound control unit 157 accepts, from the operating unit 170, one of a mute operation and an operation of changing the volume (volume change) for any of the right channel, the left channel, and both the right and left channels. In the case where the sound mode is the second sound mode, the sound control unit 157 accepts, from the operating unit 170, one of the mute operation and the operation of changing the volume for the channel through which a sound signal is being output. For example, in the case where the sound mode is the second sound mode and the second sound signal is being output to the right channel and the left channel, the sound control unit 157 accepts one of the mute operation and the operation of changing the volume for any of the right channel, the left channel, and both the right and left channels. Furthermore, in the case where the sound mode is the second sound mode and the second sound signal is being output only to the left channel, the sound control unit 157 accepts one of the mute operation and the operation of changing the volume for the left channel.

In a case where the sound in the content data 144 is in a foreign language, the user U may desire to listen only to the sound produced by the guide G. In such a case, the user U may operate the operating unit 170 to mute the output of video and sound of the content data 144. When accepting, from the operating unit 170, the operation of muting video and sound, the control unit 150 mutes the output of the first sound signal and reproduction of the video.

Furthermore, in a case where the user U appreciates pictures and does not need content based on the content data 144 describing a picture being looked at, the control unit 150 may skip reproduction of the content in a case of accepting the corresponding operation on the operating unit 170 or the like. In this case, the control unit 150 skips the content to proceed to a content describing the next picture.

In a case of accepting the mute operation, the sound control unit 157 outputs, to the processing unit 181, a control signal including a blockage instruction and a designation of a channel to be blocked. Furthermore, in a case of accepting the operation of changing the volume, the sound control unit 157 outputs, to the processing unit 181, a control signal including an instruction to change the volume, a designation of a channel for which the volume is to be changed, and a value to which the volume is to be changed.

In a case where the control signal received from the sound control unit 157 includes the blockage instruction, the processing unit 181 stops outputting a sound signal to the channel designated by the control signal. The processing unit 181 stops outputting, to the channel setting unit 183, the sound signal associated with the channel designated by the control signal. This causes muting of sound on the channel corresponding to the operation accepted from the operating unit 170.

Furthermore, in a case where the control signal received from the sound control unit 157 includes the instruction to change the volume, the processing unit 181 changes the volume of the sound signal to be output to the channel designated by the control signal, to the value designated by the control signal, and outputs the sound signal with the changed volume to the channel setting unit 183.

The channel setting unit 183 receives at least one of the first sound signal and the second sound signal.

In the case where the sound mode is the first sound mode, the channel setting unit 183 receives the first sound signal and the second sound signal. The channel setting unit 183, e.g., sets the right channel as an output channel for the first sound signal, while setting the left channel as an output channel for the second sound signal. The channel setting unit 183 may assign the first sound signal to the left channel while assigning the second sound signal to the right channel.

Alternatively, both the first sound signal and the second sound signal may be output from each of the right and left channels. In this case, an output ratio between the first sound signal and the second sound signal may be varied between the right channel and the left channel. For example, for the left channel, the first sound signal has an output ratio of 90%, and the second sound signal has an output ratio of 10%. For the right channel, the first sound signal has an output ratio of 10%, and the second sound signal has an output ratio of 90%.

Furthermore, in a case where both the first sound signal and the second sound signal are output from each of the right and left channels, the output ratio between the first and the second sound signals to be output to the right channel and the output ratio between the first and the second sound signals to be output to the left channel may be varied according to a positional relationship between the user U and the guide G. For example, the output ratio between the first and the second sound signals to be output to the right channel and the output ratio between the first and the second sound signals to be output to the left channel are varied such that the sound is heard from the direction of the guide G. Furthermore, in a case where the HMD 100 is used in a museum of art, the output ratio between the first sound signal and the second sound signal to be output to the right channel and the output ratio between the first and the second sound signals to be output to the left channel may be varied such that the sound is heard from the picture being looked at by the user U.

In the case where the sound mode is the second sound mode, the channel setting unit 183 receives one of the first sound signal and the second sound signal. The channel setting unit 183 assigns the received sound signal to the right channel and the left channel. Alternatively, the channel setting unit 183 may assign the received sound signal to one of the right channel and the left channel.

In the second mode, whether the one sound signal is assigned to both the right and left channels or one of the right and left channels may be changed depending on a presetting of the user U.

The channel setting unit 183 outputs the sound signal set for the right channel to the right channel D/A converter 185. Furthermore, the channel setting unit 183 outputs the sound signal set for the left channel to the left channel D/A converter 187.

The right channel D/A converter 185 executes a D/A conversion on the received sound signal to output a resultant analog signal to the right earphone 32. That is, the sound signal for which the right channel is set to the output channel by the channel setting unit 183 is output from the right earphone 32.

Furthermore, the left channel D/A converter 187 executes a D/A conversion on the received sound signal to output a resultant analog signal to the left earphone 34. That is, the sound signal for which the left channel is set as the output channel by the channel setting unit 183 is output from the left earphone 34.

Figure 7:
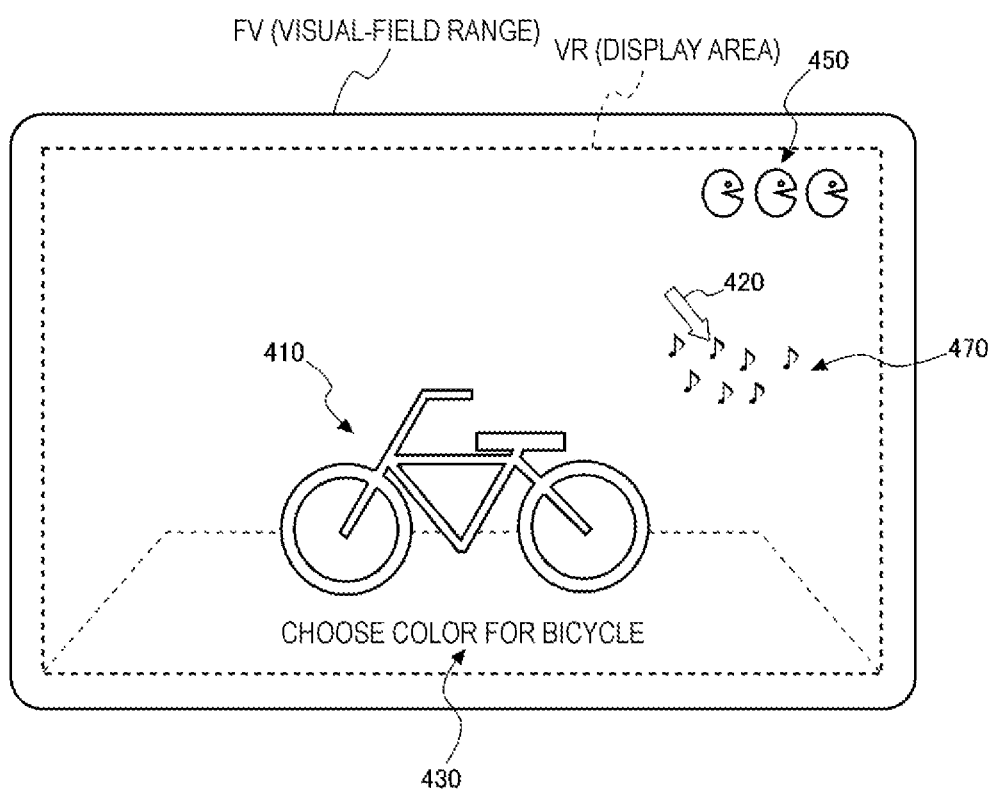
FIG. 7 is a diagram illustrating a display area.

FIG. 7 is a diagram illustrating the display area VR.

The display area VR is an area included in a visual-field range FV of the user U with the image display unit 20 mounted on the head of the user U and where the image display unit 20 can display a displayed image. The display area VR is superimposed on the outside scenery, and the user U can simultaneously visually recognize the outside scenery and the displayed image displayed by the image display unit 20. In the display area VR illustrated in FIG. 7, an image of a bicycle 410 and a pointer 420 are displayed as an example of a displayed image displayed by the image display unit 20. The display control unit 155 changes the display position of the pointer 420 in response to an operation accepted from the operation pad 14.

The display control unit 155 controls the image display unit 20 to cause the text data received from the sound recognition unit 158 to be displayed in the display area VR. FIG. 7 illustrates that characters 430 "Choose color for bicycle" are displayed as text data.

Furthermore, in the display area VR, graphics 450 indicating the volume of the first sound signal and graphics 470 indicating the volume of the second sound signal are displayed. The graphics 450 and 470 are displayed in the display area VR as a graphical user interface.

Any graphics may be used as the graphics 450 so long as the graphics 450 are shaped differently from the graphics 470 and enable the user U to recognize the volume of the first sound signal. Likewise, any graphics may be used as the graphics 470 so long as the graphics 470 are shaped differently from the graphic 450 and enable the user U to recognize the volume of the second sound signal. Furthermore, FIG. 7 illustrates an example in which the differently shaped graphics 450 and 470 are displayed, but the graphics 450 may differ from the graphics 470 in at least one of shape, color, and size.

In the display example illustrated in FIG. 7, the graphics 450 of a number corresponding to the volume of the first sound signal are displayed, and the graphics 470 of a number corresponding to the volume of the second sound signal are similarly displayed.

For example, in a case of accepting, from the operating unit 170, an operation of increasing the volume of the first sound signal, the display control unit 155 increases the number of graphics 450 in association with the increase in the volume. Furthermore, to reduce the volume of the first sound signal, the display control unit 155 reduces the number of graphics 450 in association with the reduction in the volume.

Likewise, in a case of accepting, from the operating unit 170, an operation of increasing the volume of the second sound signal, the display control unit 155 increases the number of graphics 470 in association with the increase in the volume. Furthermore, to reduce the volume of the second sound signal, the display control unit 155 reduces the number of graphics 450 in association with the reduction in the volume.

In the case where the sound mode is the first sound mode, the display control unit 155 causes the graphics 450 indicating the volume of the first sound signal and the graphics 470 indicating the volume of the second sound signal to be displayed in the display area VR. In the case where the sound mode is the second sound mode, the display control unit 155 causes one of the set of graphics 450 indicating the volume of the first sound signal and the set of graphics 470 indicating the volume of the second sound signal to be displayed in the display area VR. That is, the graphics 450 or 470 corresponding to the sound signal being output are displayed in the display area VR.

Furthermore, the size or color density of each of the graphics 450 may be varied according to the volume of the first sound signal. The display control unit 155 may vary the size of each graphic 450 such that the size of the graphic 450 increases consistently with the volume of the first sound signal or vary the display color of each graphic 450 such that the color density of the graphic 450 increases consistently with the volume of the first sound signal.

Likewise, the size or color density of each of the graphics 470 may be varied according to the volume of the second sound signal. The display control unit 155 may vary the size of each graphic 470 such that the size of the graphic 470 increases consistently with the volume of the second sound signal or vary the display color of each graphic 470 such that the color density of the graphic 470 increases consistently with the volume of the second sound signal.

Instead of the graphics 450 corresponding to the volume of the first sound signal and the graphics 470 corresponding to the volume of the second sound signal, a text indicating the volume of the first sound signal and the volume of the second sound signal may be displayed in the display area VR. For example, the display control unit 155 may display the volume of the first sound signal as a numerical value of 0% or more and 100% or less or display characters corresponding to the volume of the first sound signal, e.g., high, medium, and low. This also applies to the second sound signal.

The display control unit 155 causes the pointer 420 to be displayed in the display area as a graphical user interface. The sound control unit 157 accepts an operation on the operation surface of the operation pad 14, which is a functional unit corresponding to the "operating unit" according to the present invention, and changes the volume of the first sound signal or the second sound signal.

For example, the user U performs an operation on the operation surface of the operation pad 14 to move the pointer 420 to the display position of one of the set of graphics 450 and the set of graphics 470 that corresponds to the sound signal for which the volume is to be changed. The display control unit 155 accepts the operation on the operation surface performed by the user U, and changes the display position of the pointer 420 in the display area VR in association with the accepted operation.

When the pointer 420 is placed on one of the set of graphics 450 and the set of graphics 470, the user U performs an operation on the operation surface of the operation pad 14. The operation is different from the operation of moving the display position of the pointer 420, and includes one of, e.g., the operation of touching the operation surface of the operation pad 14, the operation of pressing the operation surface, and the operation of impacting the operation surface.

For example, in a case of accepting a tap operation on an identical position of the operation surface tapping a plurality of times, the sound control unit 157 increases, in association with the tap operation, the volume of the sound signal corresponding to one of the set of graphics 450 and the set of graphics 470 on which the pointer 420 has been placed. Furthermore, in a case of accepting a long press operation on an identical position of the operation surface, the sound control unit 157 increases, in association with the duration of detection of the long press, the volume of the sound signal corresponding to one of the set of graphics 450 and the set of graphics 470 on which the pointer 420 has been placed.

The operation of changing the volume of the sound signal may be performed by, e.g. a gesture instead of the operation on the operation surface of the operation pad 14.

The control unit 150 detects a motion of the head of the user U, based on a detected value from the six-axis sensor 235. For example, in a case of detecting an action of moving the head downward (i.e., an action of nodding), based on the detected value from the six-axis sensor 235, the control unit 150 increases the volume of the sound signal corresponding to one of the set of graphics 450 and the set of graphics 470 on which the pointer 420 has been placed. Furthermore, in a case of detecting an action of moving the head upward, based on the detected value from the six-axis sensor 235, the control unit 150 reduces the volume of the sound signal corresponding to one of the set of graphics 450 and the set of graphics 470 on which the pointer 420 has been placed.

In a case of detecting an action of turning the head of the user U leftward based on the detected value from the six-axis sensor 235, the control unit 150 may increase the volume of the sound signal corresponding to one of the set of graphics 450 and the set of graphics 470 on which the pointer 420 has been placed. In a case of detecting an action of turning the head of the user U rightward, based on the detected value from the six-axis sensor 235, the control unit 150 may decrease the volume of the sound signal corresponding to one of the set of graphics 450 and the set of graphics 470 on which the pointer 420 has been placed.

In a case of detecting an action of turning the head of the user U rightward or leftward, based on the detected value from the six-axis sensor 235, the control unit 150 may mute the sound signal corresponding to one of the set of graphics 450 and the set of graphics 470 on which the pointer 420 has been placed.

Operations of HMD

Figure 8:
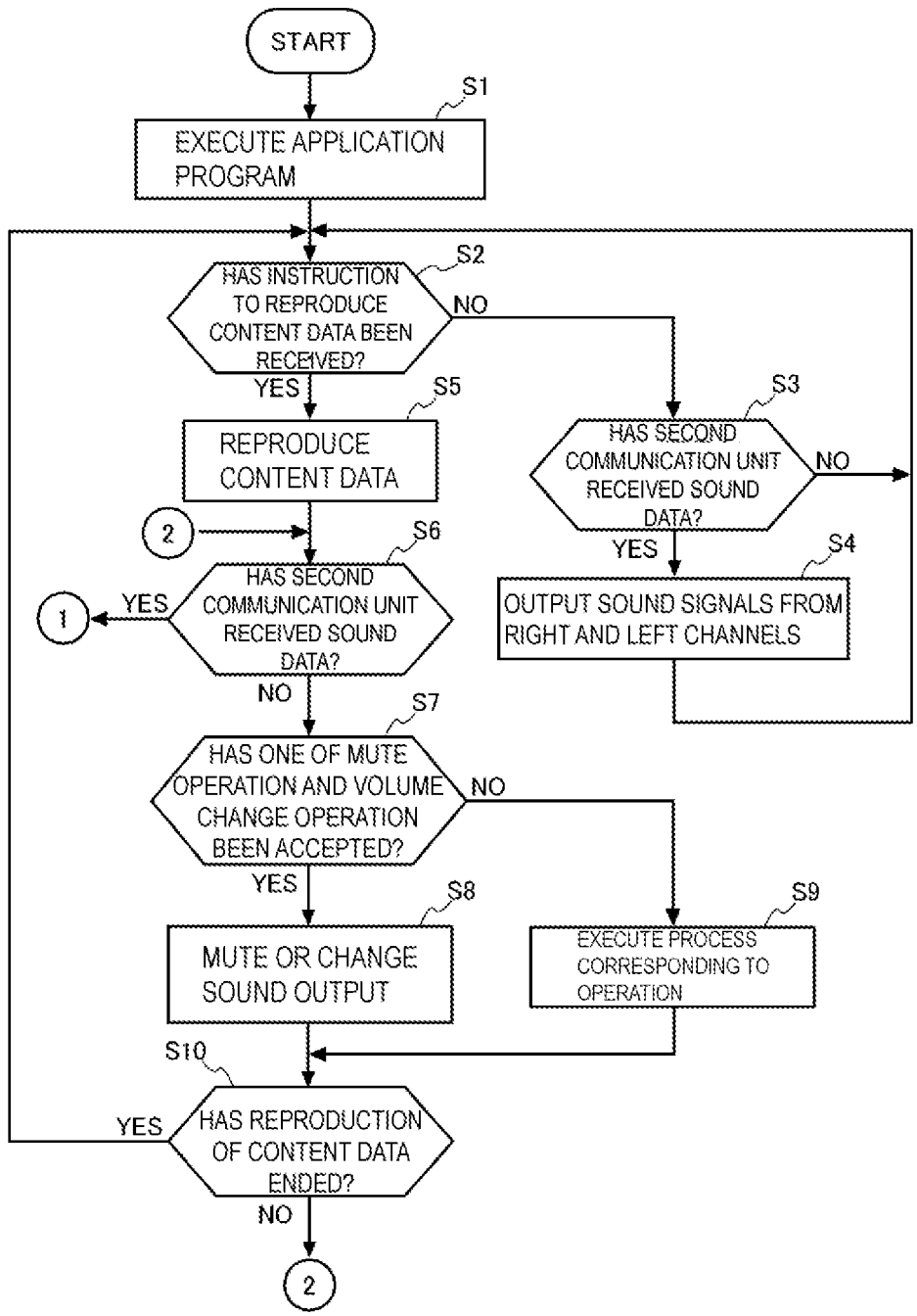
FIG. 8 is a flowchart illustrating operations of the HMD.
Figure 9:
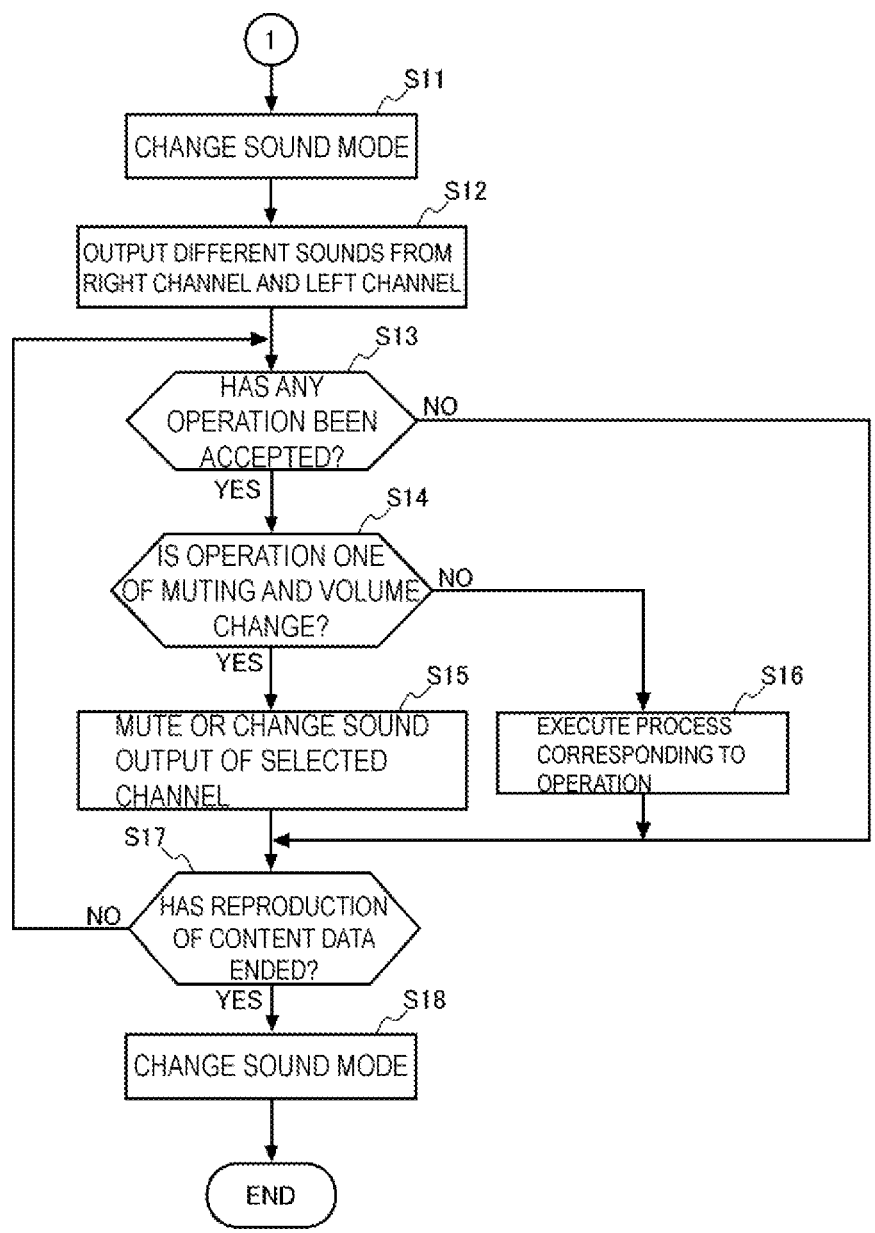
FIG. 9 is a flowchart illustrating operations of the HMD.

FIG. 8 and FIG. 9 are flowcharts illustrating operations of the control unit 150.

The control unit 150 executes the application program 142 selected by an operation of the user U (step S1). In the description, the selected application program 142 is assumed to be used for video reproduction.

The control unit 150 then determines whether an instruction to reproduce the content data 144 has been received (step S2). The control unit 150 then determines whether the first communication unit 116 has received the reproduction instruction and the identification information about the content data 144 from the terminal device 300 (step S2). In a case of not having received the instruction to reproduce the content data 144 (step S2/NO), the control unit 150 determines whether the second communication unit 117 has received a sound signal (step S3). In a case where the second communication unit 117 has received a sound signal (step S3/YES), the control unit 150 controls the sound processing unit 180 to output the received sound signal through the right channel and the left channel (step S4), and returns to the determination in step S2. Furthermore, in a case where the second communication unit 117 has received no sound signal (step S3/NO), the control unit 150 returns to the determination in step S2.

In a case of having received, in step S2, the instruction to reproduce the content data 144 (step S2/YES), the control unit 150 starts reproduction of the content data 144 specified by the identification information included in the reproduction instruction (step S5). The control unit 150 then determines whether the second communication unit 117 has received a sound signal (step S6).

In a case where the second communication unit 117 has received no sound signal (step S6/NO), the control unit 150 determines whether the control unit 150 has accepted one of the mute operation and the volume change operation from the operating unit 170 (step S7). In a case of having accepted one of the mute operation and the volume change operation (step S7/YES), the control unit 150 outputs the corresponding one of the instruction to mute the sound output and the volume change instruction to the sound processing unit 180. In accordance with the one of the mute instruction and the volume change instruction received from the control unit 150, the sound processing unit 180 mutes the sound signal being output or changes the volume (step S8). In a case of having accepted neither the mute operation nor the volume change operation (step S7/NO), the control unit 150 executes a process corresponding to an accepted operation (step S9), and proceeds to determination in step S10.

The control unit 150 determines in step S10 whether the reproduction of the content data 144 has ended. In a case where the reproduction of the content data 144 has not ended (step S10/NO), the control unit 150 returns to the determination in step S6 to determine whether the second communication unit 117 has received sound data. In a case where the reproduction of the content data 144 has ended (step S10/YES), the control unit 150 returns to step S2 to determine whether the control unit 150 has received the instruction to reproduce the content data 144 from the second communication unit 117.

In a case of determining that the second communication unit 117 has received sound data in step S6 (step S6/YES), the control unit 150 changes the sound mode (step S11). In a case where the second communication unit 117 receives sound data during reproduction of the content data 144, the control unit 150 changes the sound mode from the second sound mode to the first sound mode.

When changing the sound data to the first sound mode, the control unit 150 controls the sound processing unit 180 such that different sounds are output from the right channel and the left channel (step S12). For example, the control unit 150 controls the sound processing unit 180 such that the first sound signal for the sound included in the content data 144 is output from the left channel, while the second sound signal resulting from processing of the sound data received by the second communication unit 117 is output from the right channel.

The control unit 150 then determines whether the control unit 150 has accepted an operation from the operating unit 170 (step S13). In a case of determining that the control unit 150 has accepted no operation from the operating unit 170 (step S13/NO), the control unit 150 proceeds to determination in step S17. Furthermore, in a case of determining that the control unit 150 has accepted an operation from the operating unit 170 (step S13/YES), the control unit 150 determines whether the received operation is one of the mute operation and the volume change operation (step S14).

When determining that the received operation is one of the mute operation and the volume change operation (step S14/YES), the control unit 150 determines the channel to be muted and controls the sound processing unit 180 to mute the sound output to the determined channel (step S15). The control unit 150 also determines the channel for which the volume is to be changed and controls the sound processing unit 180 to change the volume of the sound signal to be output to the determined channel (step S15).

Furthermore, when determining that the received operation is neither the mute operation nor the volume change operation (step S14/NO), the control unit 150 executes a process corresponding to the accepted operation (step S16).

The control unit 150 then determines whether the reproduction of the content data 144 has ended (step S17). In a case of determining that the reproduction of the content data 144 has not ended (step S17/NO), the control unit 150 returns to the determination in step S13 to determine whether the control unit 150 has accepted an operation from the operating unit 170. Furthermore, in a case of determining that the reproduction of the content data 144 has ended (step S17/YES), the control unit 150 changes the sound mode from the first sound mode to the second sound mode (step S18) to end the process flow.

In the above-described exemplary embodiment, description is given of a case in which the HMD 100 uses the headset 30 with the right earphone 32 and the left earphone 34 to output sound signals. However, instead of the right earphone 32 and the left earphone 34, bone conduction speakers may be adopted. The bone conduction speakers are placed in contact with the right and left cheeks of the user U to allow the sound signal of the right channel to be output from the bone conduction speaker contacting the right cheek. Furthermore, the sound signal of the left channel is output from the bone conduction speaker contacting the left cheek.

As described above, the HMD 100 according to the exemplary embodiment includes the image display unit 20, the right earphone 32 and the left earphone 34, the second communication unit 117, and the control unit 150.

The image display unit 20 is mounted on the head of the user U to display images.

The right earphone 32 is installed in the right ear of the user U, and the left earphone 34 is installed in the left ear of the user U. The right earphone 32 receives sound output, based on the sound signal of the right channel for the right ear. Furthermore, the left earphone 34 receives sound output, based on the sound signal of the left channel for the left ear. The second communication unit 117 receives sound data. The control unit 150 respectively assigns the first sound signal associated with the image displayed by the image display unit 20 and the second sound signal received by the second communication unit 117 to the left channel and the right channel, to output the sound signals as sounds.

In the above-described configuration, the mounted HMD 100 allows the user to simultaneously listen to, e.g., in a museum or a museum of art, both the voice of the guide G and a sound involved in the video (content data 144) introducing the exhibits in the museum or the museum of art to the user.

Thus, compared to a case where the HMD 100 is mounted on the user to reproduce the content data 144 and a receiver is further mounted on the user to allow the user to listen to the sound of the guide G, the above-described configuration enables a reduction in the number of pieces of equipment to be mounted on the user U. Furthermore, compared to a case where both the receiver and the HMD 100 are operated, the HMD 100 may be exclusively operated, allowing operability to be improved.

One of the application execution unit 156 and the first communication unit 116 operates as the acquisition unit acquiring the display content data 144.

The control unit 150 causes the image display unit 20 to display the image based on the acquired content data 144 and causes the first sound signal included in the content data 144 and the second sound signal received by the second communication unit 117 to be output through the right earphone 32 and the left earphone 34.

Therefore, while the image based on the content data 144 is being displayed by the image display unit 20, the first sound signal included in the content data 144 and the second sound signal received by the second communication unit 117 may be output through the right earphone 32 and the left earphone 34.

Furthermore, the HMD 100 includes, as the user interface unit, the operating unit 170 accepting at least one of the instruction to change the volume of the sound signal output through each of the right earphone 32 and the left earphone 34 and the instruction to mute the sound signal.

The control unit 150 causes execution of one of a change in the volume of the sound signal output through each of the right earphone 32 and the left earphone 34 and muting of the sound signal, in accordance with the instruction accepted from the operating unit 170.

Therefore, the operating unit 170 may be operated to execute one of a change in the volume of the sound signal output through each of the right earphone 32 and the left earphone 34 and muting of the sound signal.

Furthermore, the operating unit 170 accepts one of the instruction to change the volume of the sound signal and the instruction to mute the sound signal for each of the right channel for the right earphone 32 and the left channel for the left earphone 34.

This configuration enables, for each of the right channel and the left channel, a change in the volume of the sound signal and muting of the sound signal.

Furthermore, the control unit 150 includes the first sound mode in which the first sound signal included in the content data 144 is output from one of the right channel and the left channel, while the second sound signal received by the second communication unit 117 is output from the other channel.

The control unit 150 also includes the second sound mode in which one of the first sound signal included in the content data 144 and the second sound signal received by the second communication unit 117 is output from one of the right channel and the left channel. The control unit 150 may switch between the first sound mode and the second sound mode for execution (the first sound mode and the second sound mode are switchable).

In the case where the sound mode is the first sound mode, the control unit 150 accepts an instruction for each of the right channel and the left channel. In the case where the sound mode is the second sound mode, the control unit 150 accepts an instruction for the channel through which a sound signal is being output.

Therefore, changing the sound mode enables a change in the channel for which a change in the volume or muting can be set.

Furthermore, the control unit 150 causes the image display unit 20 to display, as the graphical user interface, the graphics 450 corresponding to the volume of the first sound signal and the graphics 470 corresponding to the volume of the second sound signal. The control unit 150 causes the image display unit 20 to display the pointer 420 as the graphical user interface. The control unit 150 changes the display position of the pointer 420 in response to an operation performed on the operation surface of the operation pad 14 by the user U. The control unit 150 accepts the operation of changing the volume of each of the first sound signal and the second sound signal and the operation of instructing muting of each sound signal in response to an operation of the pointer 420.

This enables an operation of changing the volume of the sound signal and an operation of instructing muting of the sound signal, while visually recognizing the image displayed by the image display unit 20, allowing the operations to be more easily performed.

Furthermore, the HMD 100 includes, as the user interface unit, the operation pad 14 mounted in the controller 10 to accept an operation on the operation surface of the operation pad 14.

The control unit 150 accepts the operation of changing the volume of the sound signal and the operation of instructing muting of the sound signal in response to an operation including one of touching, pressing, and impacting the operation surface of the operation pad 14.

Therefore, the volume of the sound signal can be changed and the sound signal can be muted by the operation including one of touching, pressing, and impacting the operation surface.

Furthermore, the image display unit 20 is a transmissive display unit displaying an image in the display area VR through which the outside scenery is transmitted.

This allows the operation of changing the volume of the sound signal output to each of the right earphone 32 and the left earphone 34 and the operation of muting the sound signal to be performed while visually recognizing the image displayed in the display area VR through which the outside scenery is transmitted.

Furthermore, the control unit 150 causes the image display unit 20 to display the text corresponding to the sound signal received by the second communication unit 117.

This allows the image display unit 20 to display the text corresponding to the sound signal. Thus, in a place where sound signals are difficult to listen to, contents of the sound may be understood using the text.

Furthermore, to change the output state of the second sound signal received by the second communication unit 117, the control unit 150 changes the display state of the text to be displayed by the image display unit 20.

This allows the user U to recognize a change in the output state of the sound signal, based on the display state of the text.

Furthermore, the second communication unit 117 receives sound data through wireless communication.

Therefore, the second sound signal may be received through wireless communication. This configuration eliminates a need for wired coupling of the HMD 100 for reception of the second sound signal, enabling an increase in the range within which the second sound signal is receivable, compared to the wired coupling.

Note that the invention is not limited to the configuration of the exemplary embodiment but may be implemented in various aspects without departing from the spirits of the invention.

For example, the terminal device 300 may read, from the storage unit 370, the content data 373 to be reproduced by the HMD 100, and transmit the content data 373 to the HMD 100 through the first communication unit 310. The HMD 100 may use the application execution unit 156 to reproduce the content data 373 received from the terminal device 300. In this case, the first communication unit 116 of the HMD 100 performs operations corresponding to the "acquisition unit" according to the invention.

Furthermore, the HMD 100 may be provided with a noise canceling function to cancel noise in a case where the guide G and the user U are in a noisy place.

In the above-described exemplary embodiment, description is given of a case in which the sound output unit is the right earphone 32 and the left earphone 34 by way of example. However, loudspeakers may be provided in, e.g., the right holding unit 21 and the left holding unit 23 of the main body 11, or sound may be output through Bluetooth-coupled earphones.

Furthermore, instead of the image display unit 20, a different type of image display unit may be adopted, e.g., an image display unit worn by the user like a cap. Any image display unit may be used so long as the image display unit includes a display unit displaying an image in association with the right eye of the user U and a display unit displaying an image in association with the left eye of the user U. Alternatively, the display device according to the invention may be configured, e.g., as a head mount display mounted in a vehicle such as an automobile or an airplane. Alternatively, the display device according to the invention may be configured, e.g., as a head mount display built into a body protector such as a helmet. In this case, a portion for positioning the display with respect to the body of the user U, and another portion positioned with respect to the portion may be considered as a mounting portion.

Moreover, the controller 10 and the image display unit 20 may be integrated together, and the resultant device may be mounted on the head of the user U. Furthermore, the controller 10 may be a notebook computer, a tablet computer, portable electronic equipment including a gaming machine, a mobile phone, a smartphone, or a portable media player, or any other dedicated equipment.

In the configuration described in the exemplary embodiment, description is given of a case in which the image display unit 20 and the controller 10 are separated from each other and coupled together via the connection cable 40, by way of example. However, the controller 10 and the image display unit 20 may be coupled together by a wireless communication line.

The right light guide plate 26 and the left light guide plate 28, which are an optical system guiding image light to the eyes of the user U, may use half mirrors, diffraction gratings, prisms, or the like. The image display unit 20 may be a holography display unit.

At least some of the functional blocks illustrated in the block diagrams may be implemented by hardware or by corporation between hardware and software. The invention is not limited to the configuration in which the independent hardware resources are arranged as illustrated in the drawings. The programs executed by the control unit 150 may be stored in the nonvolatile storage unit 121 or any other storage device (not illustrated in the drawing) in the controller 10. Alternatively, programs stored in an external device may be acquired via the USB connector 19, the first communication unit 116, the second communication unit 117, the external memory interface 191, or the like for execution. Furthermore, any of the components formed in the controller 10 may also be formed in the image display unit 20. For example, a processor similar to the main processor 125 may be arranged in the image display unit 20, or the main processor 125 provided in the controller 10 and the processor of the image display unit 20 may execute separated functions.

A control method for the head mounted display device according to the invention may be implemented using a computer with a display device. In such a case, the invention may be configured in one of the following forms: a program executed by the computer to implement the control method, a recording medium in which the program is recorded so as to be readable by the computer, and a transmission medium transmitting the program. The recording medium may be one of a magnetic recording medium, an optical recording medium, and a semiconductor memory device. Specifically, examples of the recording medium may be portable or fixed recording media including a flexible disk, a Hard Disk Drive (HDD), a Compact Disk Read Only Memory (CD-ROM), a Digital Versatile Disk (DVD), a Blu-ray (trade name) Disc, a magneto-optical disk, a flash memory, and a card-type recording medium.

Alternatively, the recording medium may be a nonvolatile memory device such as a Random Access Memory (RAM), a Read Only Memory (ROM), or an HDD which is an internal storage device provided in the image display device.

The present application is based on and claims priority from JP Application Serial Number 2018-008628, filed Jan. 23, 2018, the disclosure of which is hereby incorporated by reference herein in its entirety.

What is claimed is:

1. A head mounted display device comprising:
    a display unit mounted on a user's head to display an image;
    a sound output unit configured to output sound to a right channel and to a left channel;
    a communication unit configured to receive a sound signal; and
    a control unit configured to assign both sounds associated with the image displayed by the display unit and sounds received by the communication unit based on a sound signal associated with the image displayed by the display unit and a sound signal received by the communication unit to the left channel and the right channel.

2. The head mounted display device according to claim 1, comprising:
    an acquisition unit configured to acquire content data for display with a sound signal, wherein
    the control unit is configured to cause the display unit to display an image based on the content data acquired by the acquisition unit, and cause the sound output unit to output sound based on the sound signal in the content data and sound based on the sound signal received by the communication unit.

3. The head mounted display device according to claim 2, comprising:
    a user interface unit configured to accept at least one of an instruction to change volume of a sound signal output by the sound output unit and an instruction to mute the sound signal, wherein
    the control unit is configured to cause one of a change in the volume of the sound signal output by the sound output unit and muting of the sound signal to be executed in accordance with the instruction accepted by the user interface.

4. The head mounted display device according to claim 3, wherein
    the user interface unit is configured to accept, for each channel of the sound output unit, at least one of the instruction to change the volume of the sound signal and the instruction to mute the sound signal.

5. The head mounted display device according to claim 3, wherein
    the control unit is configured to enable switching between
    a first sound mode in which the sound based on the sound signal in the content data is output from one of the right channel and the left channel, while the sound based on the sound signal received by the communication unit is output from the other of the right channel and the left channel, and
    a second sound mode in which one of the sound based on the sound signal in the content data and the sound based on the sound signal received by the communication unit is output from the right channel and the left channel, and
    the user interface unit is configured to accept, in the first sound mode, the instruction for each channel of the sound output unit, and accept, in the second sound mode, the instruction for a channel through which a sound signal is being output.

6. The head mounted display device according to claim 3, wherein
    the user interface unit includes a graphical user interface including an image to be displayed by the display unit.

7. The head mounted display device according to claim 3, wherein
    the user interface unit includes an operating unit configured to accept an operation, and is configured to accept at least one of the instruction to change the volume of the sound signal and the instruction to mute the sound signal, based on an operation including one of touch with the operating unit, pressure on the operating unit, and impact on the operating unit.

8. The head mounted display device according to claim 1, wherein
    the display unit is a transmissive display unit configured to display an image in a display area through which outside scenery is transmitted.

9. The head mounted display device according to claim 1, wherein
    the control unit is configured to cause the display unit to display a text corresponding to the sound based on the sound signal received by the communication unit.

10. The head mounted display device according to claim 9, wherein
    the control unit is configured to change, to change an output state of the sound based on the sound signal received by the communication unit, a display state of the text to be displayed by the display unit.

11. The head mounted display device according to claim 1, wherein
    the communication unit is configured to receive the sound signal through wireless communication.

12. The head mounted display device according to claim 1, wherein the control unit is configured to vary, between the right channel and the left channel, an output ratio between the sound signal associated with the image displayed by the display unit and the sound signal received by the communication unit.

13. The head mounted display device according to claim 12, wherein the control unit varies the output ratio according to a positional relationship between the user and a target.

14. A sound transmission system comprising:
    a transmission device configured to transmit a sound signal; and
    a head mounted display device configured to receive the sound signal transmitted by the transmission device, wherein
    the head mounted display device includes
    a display unit mounted on a user's head to display an image,
    a sound output unit configured to output sound to a right channel and to a left channel,
    a communication unit configured to receive the sound signal, and
    a control unit configured to assign both sounds associated with the image displayed by the display unit and sounds received by the communication unit based on a sound signal associated with the image displayed by the display unit and a sound signal received b the communication unit to the left channel and the right channel.

15. A control method for a head mounted display device including a display unit mounted on a user's head to display an image, a sound output unit configured to output sound to a right channel and to a left channel, and a communication unit, the control method comprising:

receiving a sound signal by the communication unit;
assigning both sounds associated with the image displayed by the display unit and sounds received by the communication unit based on a sound signal associated with the image displayed by the display unit and a sound signal received by the communication unit to the left channel and the right channel; and
outputting, by the sound output unit, the sound signal assigned to the left channel and the sound signal assigned to the right channel.

* * * * *